United States Patent
Wyville

(10) Patent No.: US 10,447,337 B2
(45) Date of Patent: Oct. 15, 2019

(54) DUPLEXER SYSTEM AND ASSOCIATED DIGITAL CORRECTION FOR IMPROVED ISOLATION

(71) Applicant: Telefonaktiebolaget LM Ericsson (publ), Stockholm (SE)

(72) Inventor: Mark Wyville, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 142 days.

(21) Appl. No.: 15/328,589

(22) PCT Filed: Jul. 31, 2014

(86) PCT No.: PCT/IB2014/063599
§ 371 (c)(1),
(2) Date: Jan. 24, 2017

(87) PCT Pub. No.: WO2016/016691
PCT Pub. Date: Feb. 4, 2016

(65) Prior Publication Data
US 2017/0222687 A1    Aug. 3, 2017

(51) Int. Cl.
*H04B 1/525* (2015.01)
*H04B 7/08* (2006.01)
*H04L 5/14* (2006.01)

(52) U.S. Cl.
CPC ........... *H04B 1/525* (2013.01); *H04B 7/0868* (2013.01); *H04L 5/1461* (2013.01); *H04L 5/143* (2013.01)

(58) Field of Classification Search
CPC . H04L 5/00; H04L 5/14; H04L 5/1423; H04L 5/1461; H04L 5/143; H04B 1/525; H04B 7/0868
See application file for complete search history.

(56) References Cited

U.S. PATENT DOCUMENTS

| | | |
|---|---|---|
| 6,567,648 B1 | 5/2003 | Ahn et al. |
| 8,077,639 B2 | 12/2011 | Knox |

(Continued)

FOREIGN PATENT DOCUMENTS

| | | |
|---|---|---|
| EP | 2237434 A1 | 10/2010 |
| WO | 2010063096 A1 | 6/2010 |

OTHER PUBLICATIONS

Elliott, S.J. et al., "Active Noise Control," IEEE Signal Processing Magazine, vol. 10, Issue 4, Oct. 1993, IEEE, pp. 12-35.

(Continued)

*Primary Examiner* — Un C Cho
*Assistant Examiner* — Kenan Cehic
(74) *Attorney, Agent, or Firm* — Withrow & Terranova, PLLC

(57) ABSTRACT

Systems and methods providing improved duplexer isolation are disclosed. In one embodiment, a system having improved duplexer isolation includes a duplexer system and one or more digital filters. The duplexer system includes a first transmit port, a second transmit port, a receive port, and an antenna port. The duplexer system is configured to receive a first transmit signal at the first transmit port and a second transmit signal at the second transmit port, where the first and second transmit signals are balanced transmit signals. The duplexer system is configured to combine the first and second transmit signals at the antenna port. The one or more digital filters are configured to cause destructive combining of transmit leakage signals at the receive port. As a result, the isolation of the duplexer system is substantially improved.

22 Claims, 13 Drawing Sheets

(56) References Cited

U.S. PATENT DOCUMENTS

| | | | |
|---|---|---|---|
| 8,111,640 B2 | 2/2012 | Knox | |
| 2004/0141529 A1* | 7/2004 | Lucidarme | H01Q 1/246 |
| | | | 370/516 |
| 2006/0100860 A1* | 5/2006 | Oppelt | H04B 1/66 |
| | | | 704/201 |
| 2008/0194214 A1 | 8/2008 | Wolfsberger | |
| 2008/0231241 A1* | 9/2008 | Lewis | H02J 3/1878 |
| | | | 323/215 |
| 2008/0265965 A1* | 10/2008 | Ullmann | G06K 19/077 |
| | | | 327/258 |
| 2012/0026754 A1* | 2/2012 | Ye | H02M 3/285 |
| | | | 363/17 |
| 2013/0169378 A1 | 7/2013 | Kim et al. | |
| 2014/0036969 A1 | 2/2014 | Wyville et al. | |
| 2014/0162712 A1 | 6/2014 | Feld et al. | |
| 2016/0380670 A1* | 12/2016 | Liu | H01P 1/213 |
| | | | 455/73 |
| 2017/0126445 A1* | 5/2017 | Hamouda | H04L 27/0006 |
| 2017/0187513 A9* | 6/2017 | Bharadia | H04L 5/1461 |

OTHER PUBLICATIONS

Kannangara, Shyama et al., "Adaptive Duplexer for Multiband Transreceiver," Radio and Wireless Conference (RAWCON), Aug. 2003, IEEE, pp. 381-384.

Knox, Michael E., "Single Antenna Full Duplex Communications using a Common Carrier," IEEE 13th Annual Wireless and Microwave Technology Conference (WAMICON), Apr. 15-17, 2012, IEEE, 6 pages.

Schacherbauer, W. et al., "An Interference Cancellation Technique for the Use in Multiband Software Radio Frontend Design," 30th European Microwave Conference, Oct. 2-5, 2000, IEEE, 4 pages.

International Search Report and Written Opinion for International Patent Application No. PCT/IB2014/063599, dated Mar. 30, 2015, 11 pages.

Examination Report for European Patent Application No. 14759056.6, dated Jan. 23, 2018, 4 pages.

\* cited by examiner

DUPLEXER SYSTEM AND ASSOCIATED DIGITAL CORRECTION FOR IMPROVED ISOLATION

This application is a 35 U.S.C. § 371 national phase filing of International Application No. PCT/IB2014/063599, filed Jul. 31, 2014, the disclosure of which is incorporated herein by reference in its entirety.

FIELD OF THE DISCLOSURE

The present disclosure relates to a duplexer system and, in particular, a duplexer system and associated digital correction for improved isolation.

BACKGROUND

Radio systems are used to transmit and receive signals in wireless communications systems. For example, base stations and other wireless nodes in a cellular communications network are equipped with radio systems that transmit and receive signals. Further, in many implementations (e.g., Frequency Division Duplexing (FDD)), a radio system simultaneously transmits and receives. A radio system that simultaneously transmits and receives must adequately isolate the high power transmitter from the sensitive receiver. This isolation can be obtained via separate antennas for the transmitter and the receiver or via some isolating device (e.g., a circulator or duplex filter) that duplexes the transmitter and the receiver onto the same antenna. Inadequate isolation will result in significant leakage of the transmit signal into the receiver, which can potentially desensitize the receiver.

There is a need for techniques for improving the isolation between the transmitter and the receiver in such a radio system that do not rely on incremental advancements in passive isolation (e.g., better circulators or better duplex filters). In this regard, some active cancellation techniques have been previously disclosed to cancel the portion of the transmit signal that leaks into the receiver. In particular, W. Schacherbauer et al., "An Interference Cancellation Technique for the Use in Multiband Software Radio Frontend Design," 30$^{th}$ European Microwave Conference, October 2000, pages 1-4 (hereinafter "Schacherbauer") teaches an active cancellation technique in which an auxiliary transmit chain generates a Radio Frequency (RF) cancellation signal that is used to cancel the transmitter leakage in the receiver. This technique improves isolation only in the transmit frequency band. More specifically, FIG. 1 illustrates a radio system 10 that includes an active cancellation system 12 as described in Schacherbauer. As illustrated, in addition to the active cancellation system 12, the radio system 10 includes a transmitter 14 including a Power Amplifier (PA) 16 and a receiver 18 including a Low Noise Amplifier (LNA) 20. The output of the transmitter 14 and the input of the receiver 18 are coupled to an antenna 22 via a duplexer 24 (e.g., a circulator or duplex filter).

During operation, a portion of the transmit signal output by the transmitter 14 leaks through the duplexer 24 into the receiver 18. The portion of the transmit signal that leaks into the receiver 18 is referred to as a transmit leakage signal. The active cancellation system 12 includes a digital Finite Impulse Response (FIR) filter 26 and an auxiliary transmitter 28 that operate to generate an RF cancellation signal. The RF cancelation signal is combined with the RF receive signal prior to entry to the receiver 18 via a coupler 30. The digital FIR filter 26 is designed to have a transfer function that models the leakage path from the output of the transmitter 14 through the duplexer 24 to the input of the receiver 18, including antenna reflections.

During training, a wideband training sequence is sent through the transmitter 14. This training sequence is used to calculate the coefficients of the digital FIR filter 26. Using the calculated coefficients, the digital FIR filter 26 operates such that the RF cancellation signal cancels (i.e., minimizes or otherwise mitigates) the transmit leakage signal. In doing so, isolation between the transmitter 14 and the receiver 18 is improved. In Schacherbauer, the test setup included a fixed wideband duplexer that provided 25 decibels (dB) of isolation between the transmitter 14 and the receiver 18. For a transmit signal with a 5 Megahertz (MHz) bandwidth centered at 1.96 Gigahertz (GHz), the additional isolation provided by the active cancellation system 12 was 35 dB.

S. Kannangara et al., "Adaptive Duplexer for Multiband Transreceiver," Proceedings of the 2003 Radio and Wireless Conference, Aug. 10-13, 2003, pages 381-384 (hereinafter "Kannangara") teaches another active cancellation technique. In particular, Kannangara teaches an active cancellation system that utilizes a feed-forward technique to enhance a fixed duplexer by improving isolation in both the transmit frequency band and the receive frequency band. FIG. 2 illustrates a radio system 32 that includes an active cancellation system 34 that implements the feed-forward technique of Kannangara. As illustrated, in addition to the active cancellation system 34, the radio system 32 includes a transmitter 36 including a PA 38 and a receiver 40 including an LNA 42. The output of the transmitter 36 and the input of the receiver 40 are coupled to an antenna 44 via a duplexer 46 (e.g., a circulator or duplex filter).

During operation, a portion of the transmit signal output by the transmitter 36 leaks through the duplexer 46 into the receiver 40. The active cancellation system 34 includes a coupler 48, a splitter 50, fixed delays 52 and 54, a pair of vector attenuators 56 and 58, a combiner 60, and another coupler 62. The coupler 48 taps the output of the transmitter 36. The resulting signal is then split by the splitter 50 to provide two feed-forward signals. The feed-forward signals are passed through the corresponding delays 52 and 54 and vector attenuators 56 and 58 to provide delayed and attenuated feed-forward signals. The delayed and attenuated feed-forward signals are combined by the combiner 60 to provide an RF cancellation signal, which is then combined with the RF receive signal via the coupler 62. The vector attenuators 56 and 58 are used to adjust the phase and amplitude of the delayed feed-forward signals to provide the desired cancellation. In Kannangara, measured results were published with a transmit frequency band centered at 1955 MHz and a receive frequency band centered at 2145 MHz. The duplexer 46 used for the measurements in Kannangara provided at least 20 dB of isolation in both bands. The active cancellation system 34 increased the isolation in the transmit frequency band by 47 dB and increased the isolation in the receive frequency band by 38 dB. The attenuation was measured over 5 MHz channel bandwidths.

M. Knox, "Single Antenna Full Duplex Communications Using a Common Carrier," 2012 IEEE 13$^{th}$ Annual Wireless an Microwave Technology Conference, Apr. 15-17, 2012, pages 1-6 (hereinafter the "Knox Article") and U.S. Pat. No. 8,111,640 B2 entitled "Antenna Feed Network for Full Duplex Communication" to Knox, which was filed on Jul. 10, 2009 and issued on Feb. 7, 2012 (hereinafter the "Knox Patent") teach another active cancellation technique. In the Knox Article and the Knox Patent, the transmit signal at the output of the transmitter is split into two paths using a hybrid coupler. The split transmit signals are orthogonal due to the −90° phase shift in one path of the hybrid coupler. The split signals are then fed to an antenna that has two feed-points that are intended for orthogonal signals. An example is an antenna that sends/receives a circularly polarized signal by transmitting two linearly polarized signals that are perpendicular where the signals to each polarization have a phase difference of 90°. Another hybrid coupler is used in the receive path. Due to the phase shifts of the hybrid couplers, the transmit leakage signal is destructively combined before going into the receiver, thereby reducing leakage and improving isolation.

The advanced cancellation technique of the Knox Article and the Knox Patent is implemented in a radio system 64 of FIG. 3. The radio system 64 includes a transmitter 66 including a Digital-to-Analog Converter (DAC) 68 and PA 70, and a receiver 72 including an LNA 74 and an Analog-to-Digital Converter (ADC) 76. The output of the transmitter 66 and the input of the receiver 72 are coupled to an antenna 78 via a duplexer system 80. The duplexer system 80 includes a first hybrid coupler 82, circulators 84 and 86, and a second hybrid coupler 88. In operation, an RF transmit signal is output from the transmitter 66 to a first port 90 of the first hybrid coupler 82. The first hybrid coupler 82 applies an approximately −90° phase shift to the RF transmit signal to provide a first phase-shifted RF transmit signal at a second port 92 of the first hybrid coupler 82 and applies an approximately 0° phase shift to the RF transmit signal to provide a second phase-shifted RF transmit signal at a third port 94 of the first hybrid coupler 82. Ideally, the two phase shifts are exactly −90° and 0°, respectively. However, due to, e.g., manufacturing tolerances, the phase shifts may vary from the ideal case (e.g., −88° and 2°).

The first phase-shifted RF transmit signal is provided to a first port 96 of the circulator 84. Due to the normal operation of the circulator 84, the circulator 84 passes the first phase-shifted RF transmit signal from the first port 96 of the circulator 84 to a second port 98 of the circulator 84. However, a portion of the first phase-shifted RF transmit signal (i.e., a first phase-shifted transmit signal) leaks from the first port 96 of the circulator 84 to a third port 100 of the circulator 84. In a similar manner, the second phase-shifted RF transmit signal is provided to a first port 102 of the circulator 86. Due to the normal operation of the circulator 86, the circulator 86 passes the second phase-shifted RF transmit signal from the first port 102 of the circulator 86 to a second port 104 of the circulator 86. However, a portion of the second phase-shifted RF transmit signal (i.e., a second phase-shifted transmit signal) leaks from the first port 102 of the circulator 86 to a third port 106 of the circulator 86.

In this case, the first and second phase-shifted transmit signals provided from the circulators 84 and 86 are 90° out-of-phase (i.e., are orthogonal). The first and second phase-shifted RF transmit signals are provided to two orthogonal feed-points of the antenna 78. Notably, while FIG. 3 illustrates two antennas, only one antenna is used, but with two orthogonal feed-points. As such, the antenna 78 functions as two separate antennas with different properties (e.g., different polarizations).

During reception of an RF receive signal, the first phase-shifted transmit leakage signal at the third port 100 of the circulator 84 enters a first port 108 of the second hybrid coupler 88. Similarly, the second phase-shifted transmit leakage signal at the third port 106 of the circulator 86 enters a second port 110 of the second hybrid coupler 88. At this point, the first phase-shifted transmit leakage signal is approximately −90° out-of-phase with the second phase-shifted transmit leakage signal. The second hybrid coupler 88 applies an approximately −90° phase shift to the first phase-shifted transmit leakage signal when passing the first phase-shifted transmit leakage signal from the first port 108 of the second hybrid coupler 88 to a third port 112 of the second hybrid coupler 88, and applies an approximately 0° phase shift to the second phase-shifted transmit leakage signal when passing the second phase-shifted transmit leakage signal from the second port 110 of the second hybrid coupler 88 to the third port 112 of the second hybrid coupler 88. Due to the phase shifts applied by the first and second hybrid couplers 82 and 88, the first and second phase-shifted transmit leakage signals are approximately 180° out-of-phase at the third port 112 of the second hybrid coupler 88. Therefore, the first and second phase-shifted transmit leakage signals destructively combine at the third port 112 of the second hybrid coupler 88. In this manner, the transmitter leakage is cancelled, or mitigated, before entering the receiver 72. Further, during transmission, signals that are reflected back from the antenna 78 will also experience some destructive combining prior to going into the receiver 72, thereby reducing leakage due to antenna reflections.

The author of the Knox Article is also an inventor listed on U.S. Pat. No. 8,077,639 B2, entitled "High Isolation Signal Routing Assembly for Full Duplex Communication," which was filed on Jun. 29, 2009 and issued on Dec. 13, 2011 (hereinafter the "Second Knox Patent"). A representative figure for the teachings of the Second Knox Patent is illustrated in FIG. 4. Notably, FIG. 4 is substantially the same as FIG. 3 but where the dual-input antenna 78 is replaced with a hybrid coupler 114 and an antenna 116 with a single input. Otherwise, the radio system 64 of FIG. 4 operates the same as that described above with respect to FIG. 3, particularly with respect to cancellation of the transmitter leakage.

Each of the active cancellation techniques above has its own associated problems. In particular, the active cancellation technique of Schacherbauer and illustrated in FIG. 1 uses a cancellation signal that is a linear function of the baseband digital signal. The cancellation signal cannot cancel Intermodulation Distortion (IMD) or noise generated by any of the transmitter components. Furthermore, any noise or IMD generated by the auxiliary transmitter 28 in the receive frequency band decreases the sensitivity of the receiver 18. Large attenuation performance is limited to transmitters with low noise and highly linear components.

The active cancellation technique of Kannangara was designed for a mobile terminal, not a base station. The dynamic range of the base station transmit signal between the transmit frequency band and the receive frequency band is much larger than that of mobile terminals. As such, implementing the active cancellation technique of Kannangara in a base station would require vector modulators with the same dynamic range in the feed-forward paths, which is infeasible for typical base station requirements.

The active cancellation technique of the Knox Article, the Knox Patent, and the Second Knox Patent is limited by component tolerance and frequency variation (i.e., gain and phase shift of the hybrid couplers). Furthermore, the Knox Article and the Knox Patent require an antenna with two orthogonal input feed points. The reflections from these feed points are assumed to be equal to realize cancellation of the antenna reflections. So, the antenna design is further constrained to ensure this assumption applies.

In light of the discussion above, there is a need for a duplexer system providing improved transmitter-receiver isolation.

SUMMARY

Systems and methods for providing improved duplexer isolation are provided. In one embodiment, a system having improved duplexer isolation includes a duplexer system and one or more digital filters. The duplexer system includes a first transmit port, a second transmit port, a receive port, and an antenna port. The duplexer system is configured to receive a first transmit signal at the first transmit port and a second transmit signal at the second transmit port, where the first and second transmit signals are balanced transmit signals. The duplexer system is configured to combine the first and second transmit signals to provide a combined transmit signal at the antenna port. The one or more digital filters are configured to cause a phase difference between the first transmit signal received at the first transmit port and the second transmit signal received at the second transmit port such that a first transmit leakage signal resulting from leakage of the first transmit signal from the first transmit port to the receive port and a second transmit leakage signal resulting from leakage of the second transmit signal from the second transmit port to the receive port destructively combine at the receive port.

In one embodiment, the phase difference is further such that the first and second transmit signals are constructively combined by the duplexer system to provide the combined transmit signal at the antenna port. In this manner, the system provides constructive combining of the first and second transmit signals at the antenna port while also providing destructive combining of the first and second transmit leakage signals at the receive port. As a result, the isolation of the duplexer system is substantially improved.

In one embodiment, the duplexer system is configured to: (a) apply a first phase shift to the first transmit signal to provide a first phase-shifted transmit signal and apply a second phase shift to the second transmit signal to provide a second phase-shifted transmit signal, (b) combine the first phase-shifted transmit signal and the second phase-shifted transmit signal to provide the combined transmit signal at the antenna port, (c) receive an initial receive signal at the antenna port, (d) apply a third phase shift to the initial receive signal to provide a first receive signal and apply a fourth phase shift to the initial receive signal to provide a second receive signal, (e) apply a fifth phase shift to the first receive signal to provide a first phase-shifted receive signal and apply a sixth phase shift to the second receive signal to provide a second phase-shifted receive signal, and (f) combine the first phase-shifted receive signal and the second phase-shifted receive signal to provide a combined receive signal at the receive port. The one or more digital filters are configured to cause the phase difference between the first transmit signal and the second transmit signal such that: (i) the phase difference between the first transmit signal and the second transmit signal and the first and second phase shifts cause the first and second phase-shifted transmit signals to constructively combine to provide the combined transmit signal at the antenna port, and (ii) the phase difference between the first transmit signal and the second transmit signal and the fifth and sixth phase shifts cause the first transmit leakage signal resulting from leakage of the first transmit signal from the first transmit port to the receive port and the second transmit leakage signal resulting from leakage of the second transmit signal from the second transmit port to the receive port to destructively combine when combining the first and second phase-shifted receive signals to provide the combined received signal at the receive port.

In one embodiment, the duplexer system includes a first duplexer device, a second duplexer device, a first combiner/splitter circuit, and a second combiner circuit. The first duplexer device includes a transmit port corresponding to the first transmit port of the duplexer system, a receive port, and an antenna port. The second duplexer device includes a transmit port corresponding to the second transmit port of the duplexer system, a receive port, and an antenna port. The first combiner/splitter circuit includes a first port coupled to the antenna port of the first duplexer device, a second port coupled to the antenna port of the second duplexer device, and a third port corresponding to the antenna port of the duplexer system. The second combiner circuit includes a first port coupled to the receive port of the first duplexer device, a second port coupled to the receive port of the second duplexer device, and a third port corresponding to the receive port of the duplexer system. In one embodiment, the first combiner/splitter circuit is a first hybrid coupler, and the second combiner circuit is a second hybrid coupler. In one embodiment, the first duplexer device is a first duplex filter, and the second duplexer device is a second duplex filter. In another embodiment, the first duplexer device is a first circulator, and the second duplexer device is a second circulator.

In one embodiment, the first combiner/splitter circuit is configured to: (a) receive the first transmit signal from the antenna port of the first duplexer device at the first port of the first combiner/splitter circuit and receive the second transmit signal from the antenna port of the second duplexer device at the second port of the first combiner/splitter circuit, (b) apply a first phase shift to the first transmit signal to provide the first phase-shifted transmit signal and apply a second phase shift to the second transmit signal to provide the second phase-shifted transmit signal, (c) combine the first phase-shifted transmit signal and the second phase-shifted transmit signal at the third port of the first combiner/splitter circuit to provide the combined transmit signal at the antenna port of the duplexer system, (d) receive an initial receive signal at the third port of the first combiner/splitter circuit, and (e) apply a third phase shift to the initial receive signal to provide the first receive signal at the first port of the first combiner/splitter circuit and apply a fourth phase shift to the initial receive signal to provide the second receive signal at the second port of the first combiner/splitter circuit. The second combiner circuit is configured to: (i) receive, at the first port of the second combiner circuit, the first receive signal from the receive port of the first duplexer device, (ii) receive, at the second port of the second combiner circuit, the second receive signal from the receive port of the second duplexer device, (iii) apply a fifth phase shift to the first receive signal to provide the first phase-shifted receive signal and apply a sixth phase shift to the second receive signal to provide the second phase-shifted receive signal, and (iv) combine the first phase-shifted receive signal and the second phase-shifted receive signal to provide the combined receive signal at the third port of the second combiner circuit.

In one embodiment, the first phase shift is approximately 0 degrees, the second phase shift is approximately −90 degrees, the third phase shift is approximately 0 degrees, the fourth phase shift is approximately −90 degrees, the fifth phase shift is approximately −90 degrees, and the sixth phase shift is approximately 0 degrees.

In one embodiment, the one or more digital filters are configured to cause the phase difference between the first transmit signal and the second transmit signal such that: (a) the phase difference between the first transmit signal and the second transmit signal and the first and second phase shifts cause the first and second phase-shifted transmit signals to constructively combine at the third port of the first combiner/splitter circuit to provide the combined transmit signal and (b) the phase difference between the first transmit signal and the second transmit signal and the fifth and sixth phase shifts cause the first transmit leakage signal resulting from leakage of the first transmit signal from the first transmit port to the receive port and the second transmit leakage signal resulting from leakage of the second transmit signal from the second transmit port to the receive port to destructively combine at the third port of the second combiner circuit when combining the first and second phase-shifted receive signals to provide the combined received signal.

In one embodiment, the duplexer system includes a first transmit filter, a second transmit filter, a combiner/splitter circuit, and a receive filter. The first transmit filter includes an input port corresponding to the first transmit port of the duplexer system and an output port. The second transmit filter includes an input port corresponding to the second transmit port of the duplexer system and an output port. The combiner/splitter circuit includes a first port coupled to the output port of the first transmit filter, a second port coupled to the output port of the second transmit filter, a third port corresponding to the antenna port of the duplexer system, and a fourth port. The receive filter includes an input port coupled to the fourth port of the combiner/splitter circuit and an output port corresponding to the receive port of the duplexer system. In one embodiment, the combiner/splitter circuit is a hybrid coupler.

In one embodiment, the combiner/splitter circuit is configured to, for transmission: (a) receive the first transmit signal from the output port of the first transmit filter at the first port of the combiner/splitter circuit and receive the second transmit signal from the output port of the second transmit filter at the second port of the combiner/splitter circuit, (b) apply a first phase shift to the first transmit signal to provide a first phase-shifted transmit signal and apply a second phase shift to the second transmit signal to provide a second phase-shifted transmit signal, and combine the first phase-shifted transmit signal and the second phase-shifted transmit signal at the third port of the combiner/splitter circuit to provide the combined transmit signal at the antenna port of the duplexer system. For reception, the combiner/splitter circuit is further configured to: (i) receive an initial receive signal at the third port of the combiner/splitter circuit, (ii) apply a third phase shift to the initial receive signal to provide a first receive signal at the first port of the combiner/splitter circuit and apply a fourth phase shift to the initial receive signal to provide a second receive signal at the second port of the combiner/splitter circuit, (iii) receive the first receive signal at the first port of the combiner/splitter circuit after reflection of the first receive signal from the output port of the first transmit filter, (iv) receive the second receive signal at the second port of the combiner/splitter circuit after reflection of the second receive signal from the output port of the second transmit filter, (v) apply a fifth phase shift to the first receive signal to provide a first phase-shifted receive signal and apply a sixth phase shift to the second receive signal to provide a second phase-shifted receive signal, and (vi) combine the first phase-shifted receive signal and the second phase-shifted receive signal to provide a combined receive signal at the fourth port of the combiner/splitter circuit.

In one embodiment, the first phase shift is approximately −90 degrees, the second phase shift is approximately 0 degrees, the third phase shift is approximately −90 degrees, the fourth phase shift is approximately 0 degrees, the fifth phase shift is approximately 0 degrees, and the sixth phase shift is approximately −90 degrees.

In one embodiment, the one or more digital filters are configured to cause the phase difference between the first transmit signal and the second transmit signal such that: (a) the phase difference between the first transmit signal and the second transmit signal and the first and second phase shifts cause the first and second phase-shifted transmit signals to constructively combine at the third port of the combiner/splitter circuit to provide the combined transmit signal, and (b) the phase difference between the first transmit signal and the second transmit signal and the fifth and sixth phase shifts cause the first transmit leakage signal resulting from leakage of the first transmit signal from the first transmit port to the fourth port of the combiner/splitter circuit and the second transmit leakage signal resulting from leakage of the second transmit signal from the second transmit port to the fourth port of the combiner/splitter circuit to destructively combine at the fourth port of the combiner/splitter circuit when combining the first and second phase-shifted receive signals to provide the combined received signal.

In one embodiment, the one or more digital filters comprise a digital filter configured to filter a digital input signal to provide a filtered digital input signal, and the system further includes a first transmitter configured to process the digital input signal to provide the first transmit signal, and a second transmitter configured to process the filtered digital input signal to provide the second transmit signal. In one embodiment, the first and second transmitters are balanced, and power of both of the first and second transmitters contributes to power of the combined transmit signal.

In one embodiment, the one or more digital filters further operate to compensate for analog imperfections in the duplexer system.

In one embodiment, the one or more digital filters are configured to adjust a phase and at least one of a magnitude and a group delay of at least one of the first and second transmit signals such that residual transmitter leakage after destructively combining the first and second transmit leakage signals is minimized.

In one embodiment, the one or more digital filters are configured to adjust a phase and at least one of a magnitude and a group delay of at least one of the first and second transmit signals such that residual transmitter leakage in a transmit band after destructively combining the first and second transmit leakage signals is minimized.

In one embodiment, the one or more digital filters are configured to adjust a phase and at least one of a magnitude and a group delay of at least one of the first and second transmit signals such that residual transmitter leakage in a receive band after destructively combining the first and second transmit leakage signals is minimized. In one embodiment, the residual transmitter leakage in the receive band comprises at least one of intermodulation distortion and noise.

In one embodiment, the one or more digital filters are configured to adjust a phase and at least one of a magnitude and a group delay of at least one of the first and second transmit signals such that transmitter leakage in both the transmit band and the receive band are mitigated.

In another embodiment, a method for providing improved isolation for a duplexer system is provided. In one embodiment, the method includes combining, via a duplexer system, a first transmit signal and a second transmit signal to provide a combined transmit signal at an antenna port of the duplexer system, where the first and second transmit signals are balanced transmit signals. The method further includes causing, via one or more digital filters, a phase difference between the first transmit signal and the second transmit signal such that: (a) the first and second transmit signals are constructively combined when combining the first transmit signal and the second transmit signal to provide the combined transmit signal at the antenna port of the duplexer system and (b) a first transmit leakage signal resulting from leakage of the first transmit signal from a first transmit port of the duplexer system to a receive port of the duplexer system and a second transmit leakage signal resulting from leakage of the second transmit signal from a second transmit port of the duplexer system to the receive port of the duplexer system destructively combine at the receive port.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for providing improved duplexer isolation are provided. In the embodiments described below, the systems and methods are described with respect to a radio system for a wireless node, e.g., a base station or wireless (e.g., mobile) device in a cellular communications network. However, the present disclosure is not limited thereto. The systems and methods described herein may be implemented in any system in which improved duplexer isolation is desired (e.g., any system in which it is desired to split or combine two signals at two different frequencies). Further, while the discussion below focuses on a duplexer system, the concepts described herein can be applied to a multiplexer (i.e., multiple signals at multiple different frequencies).

Figure 5:
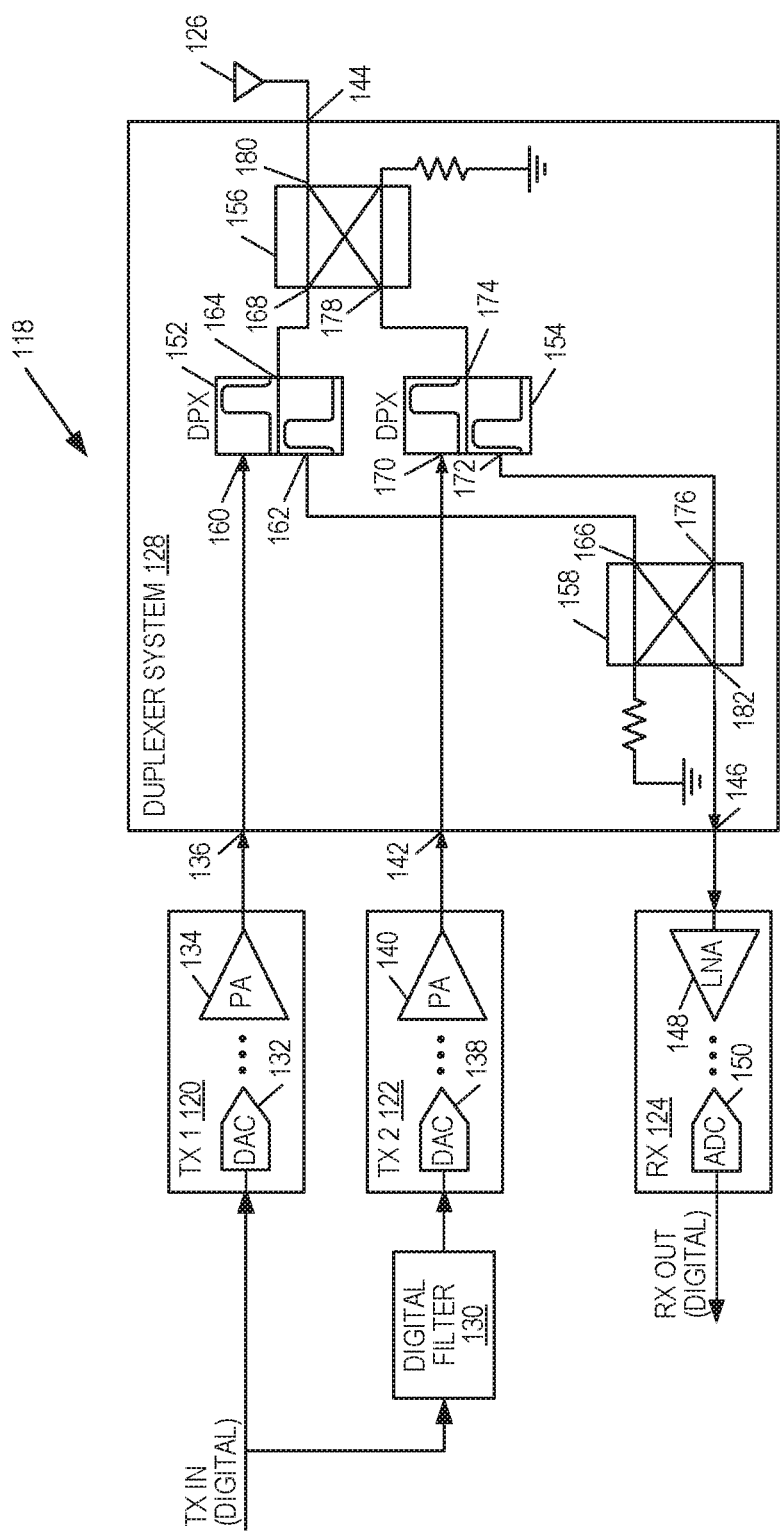
FIG. 5 illustrates a radio system including a duplexer system and an associated digital filter that operate together to provide improved isolation according to one embodiment of the present disclosure.

FIG. 5 illustrates a radio system 118 according to one embodiment of the present disclosure. The radio system 118 includes transmitters 120 and 122 and a receiver 124 coupled to an antenna 126 via a duplexer system 128. In addition, the radio system 118 includes a digital filter 130 (e.g., a digital Finite Impulse Response (FIR) filter) that operates together with the duplexer system 128 to provide improved transmitter-receiver isolation. In other words, the digital filter 130 and the duplexer system 128 operate together to minimize or otherwise mitigate transmitter leakage including, in some embodiments, antenna reflections. Notably, while the digital filter 130 is illustrated as being in the transmit path through the transmitter 122, the digital filter 130 may alternatively be implemented in the transmit path through the transmitter 120. In another embodiment, a separate digital filter may be utilized in each of the transmit paths. Thus, while the discussion below focuses on the digital filter 130 being implemented in the transmit path through the transmitter 122, it should be appreciated that the discussion can be extended to embodiments where the digital filter 130 is implemented in the other transmit path or where digital filters are implemented in both of the transmit paths.

The transmitter 120 includes, in this example, a Digital-to-Analog Converter (DAC) 132 and a Power Amplifier (PA) 134. While not illustrated for clarity and ease of discussion, one of the ordinary skill in the art will readily appreciate that the transmitter 120 typically includes other components such as, for example, mixer(s), filter(s), modulator(s), etc. The output of the transmitter 120 is coupled to a first transmit port 136 of the duplexer system 128. In a similar manner, the transmitter 122 includes, in this example, a DAC 138 and a PA 140. Again, while not illustrated for clarity and ease of discussion, one of the ordinary skill in the art will readily appreciate that the transmitter 122 typically includes other components such as, for example, mixer(s), filter(s), modulator(s), etc. The input of the transmitter 122 is coupled to the output of the digital filter 130, and the output of the transmitter 122 is coupled to a second transmit port 142 of the duplexer system 128. An antenna port 144 of the duplexer system 128 is coupled to the antenna 126. A receive port 146 of the duplexer system 128 is coupled to the input of the receiver 124. As illustrated, in this example, the receiver 124 includes a Low Noise Amplifier (LNA) 148 and an Analog-to-Digital Converter (ADC) 150.

In this embodiment, the duplexer system 128 includes duplex filters 152 and 154 and hybrid couplers 156 and 158.

Note that while the embodiments illustrated herein utilize hybrid couplers such as the hybrid couplers 156 and 158, other types of components capable of combining signals as described herein may be used (e.g., a Wilkinson combiner with phase shifters, or a hybrid transformer). The duplex filter 152 has a transmit port 160, a receive port 162, and an antenna port 164. The transmit port 160 of the duplex filter 152 corresponds to the first transmit port 136 of the duplexer system 128. The receive port 162 of the duplex filter 152 is coupled to a first port 166 of the hybrid coupler 158, and the antenna port 164 of the duplex filter 152 is coupled to a first port 168 of the hybrid coupler 156. In a similar manner, the duplex filter 154 has a transmit port 170, a receive port 172, and an antenna port 174. The transmit port 170 of the duplex filter 154 corresponds to the second transmit port 142 of the duplexer system 128. The receive port 172 of the duplex filter 154 is coupled to a second port 176 of the hybrid coupler 158, and the antenna port 174 of the duplex filter 154 is coupled to a second port 178 of the hybrid coupler 156. A third port 180 of the hybrid coupler 156 corresponds to the antenna port 144 of the duplexer system 128, and a third port 182 of the hybrid coupler 158 corresponds to the receive port 146 of the duplexer system 128.

In operation, a digital input signal is provided to the input of the transmitter 120 and the input of the digital filter 130. The transmitter 120 processes the digital input signal to provide a first Radio Frequency (RF) transmit signal. Likewise, the transmitter 122 processes the filtered digital input signal output by the digital filter 130 to provide a second RF transmit signal. The transmitters 120 and 122 are "balanced." As used herein, the transmitters 120 and 122 are "balanced" when they have approximately the same transfer functions (i.e., gain, phase, and group delay) over the transmit frequency band. Note, however, that due to, e.g., manufacturing tolerances, the two transmitters 120 and 122 may not have exactly the same transfer functions. As such, the term "balanced" should not be construed as meaning exactly balanced or as having exactly the same transfer functions. However, in the preferred embodiment, the transmitters 120 and 122 are designed to have the same transfer functions and, as such, are "balanced," but may not be perfectly balanced due to, e.g., manufacturing tolerances.

Because the transmitters 120 and 122 are balanced, the first and second RF transmit signals output by the transmitters 120 and 122 are also referred to herein as being "balanced" transmit signals. However, as discussed below, the digital filter 130 applies a phase shift that creates a phase difference between the first and second RF transmit signals in order to cause destructive combining of a transmitter leakage signal from the first transmit port 136 of the duplexer system 128 to the receive port 146 of the duplexer system 128 with a transmitter leakage signal from the second transmit port 142 of the duplexer system 128 to the receive port 146 of the duplexer system 128. In addition, the digital filter 130 may apply a magnitude and/or group delay adjustment to compensate for, e.g., any mismatch in the duplex filters 152 and 154 with respect to the first and second transmitter leakage signals. As such, while the RF transmit signals output by the transmitters 120 and 122 are referred to as being "balanced," it is to be understood that the RF transmit signals will have different phases and may, in some situations, have some variation in magnitude and group delay as a result of the digital filter 130.

Figure 1:
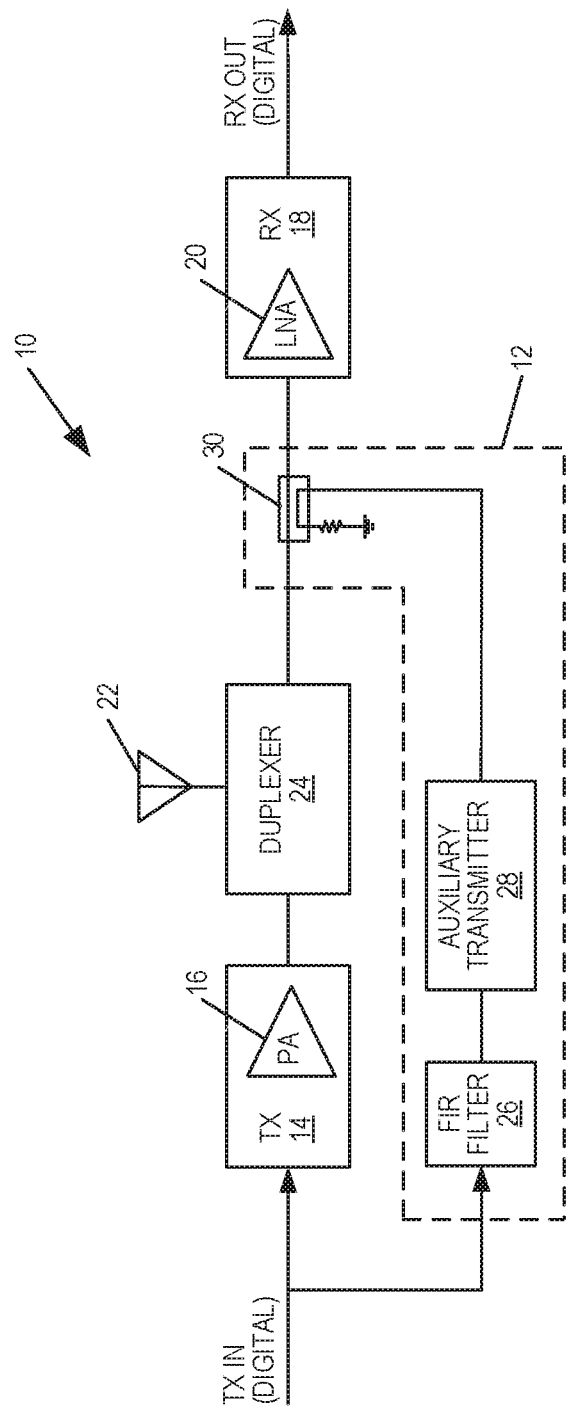
FIG. 1 illustrates a radio system including an active cancellation system that utilizes a digital Finite Impulse Response (FIR) filter and an auxiliary transmitter to generate a cancellation signal for cancelling transmitter leakage.
Figure 2:
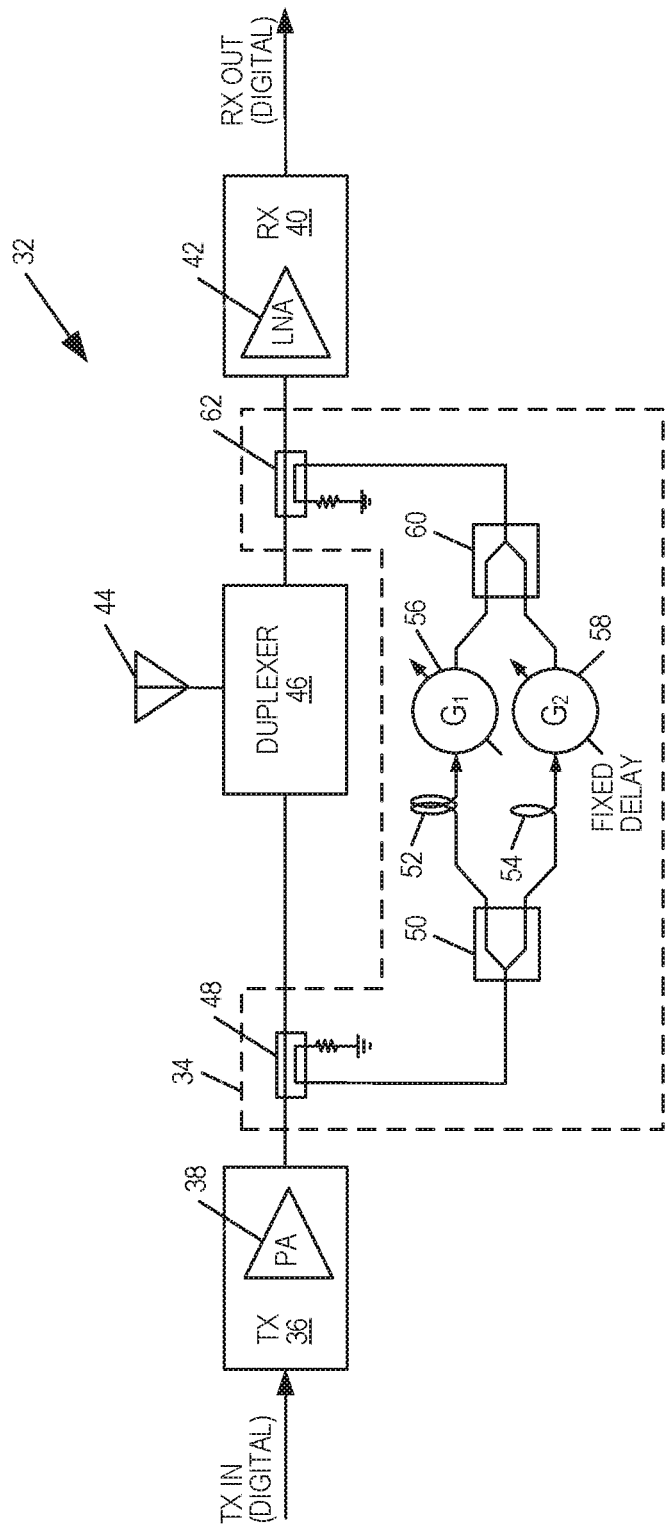
FIG. 2 illustrates a radio system including an active cancellation system that implements a feed-forward technique.
Figure 3:
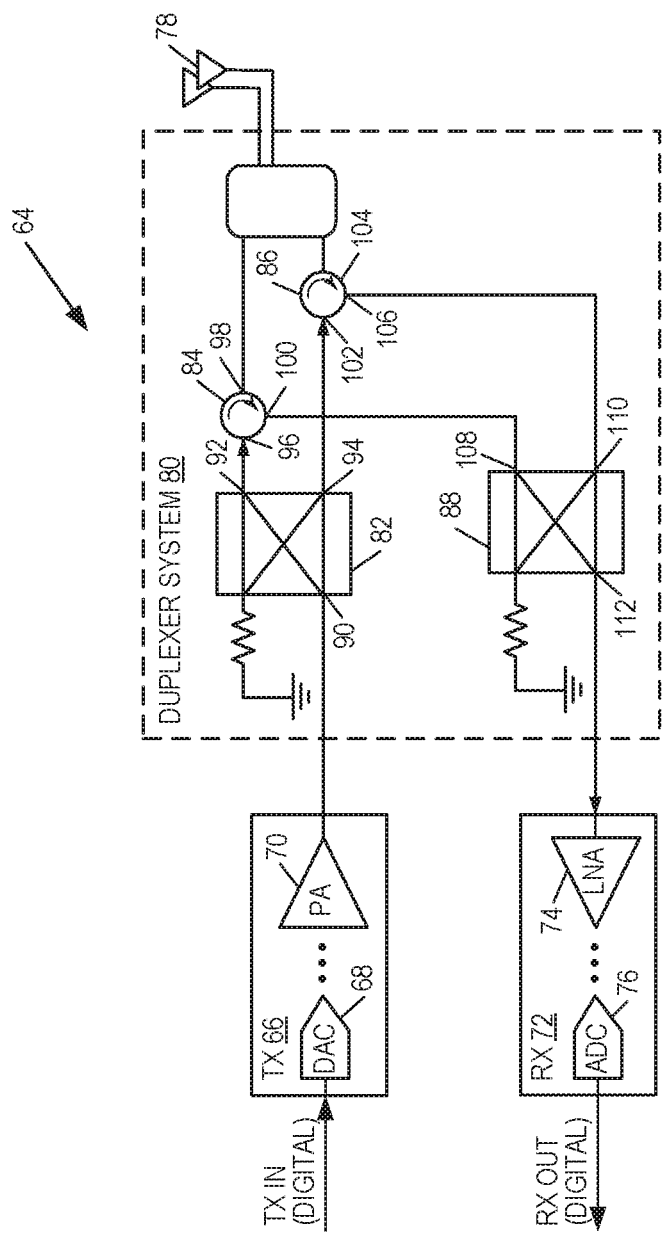
FIG. 3 illustrates a radio system including a duplexer system that implements a cancellation technique.
Figure 4:
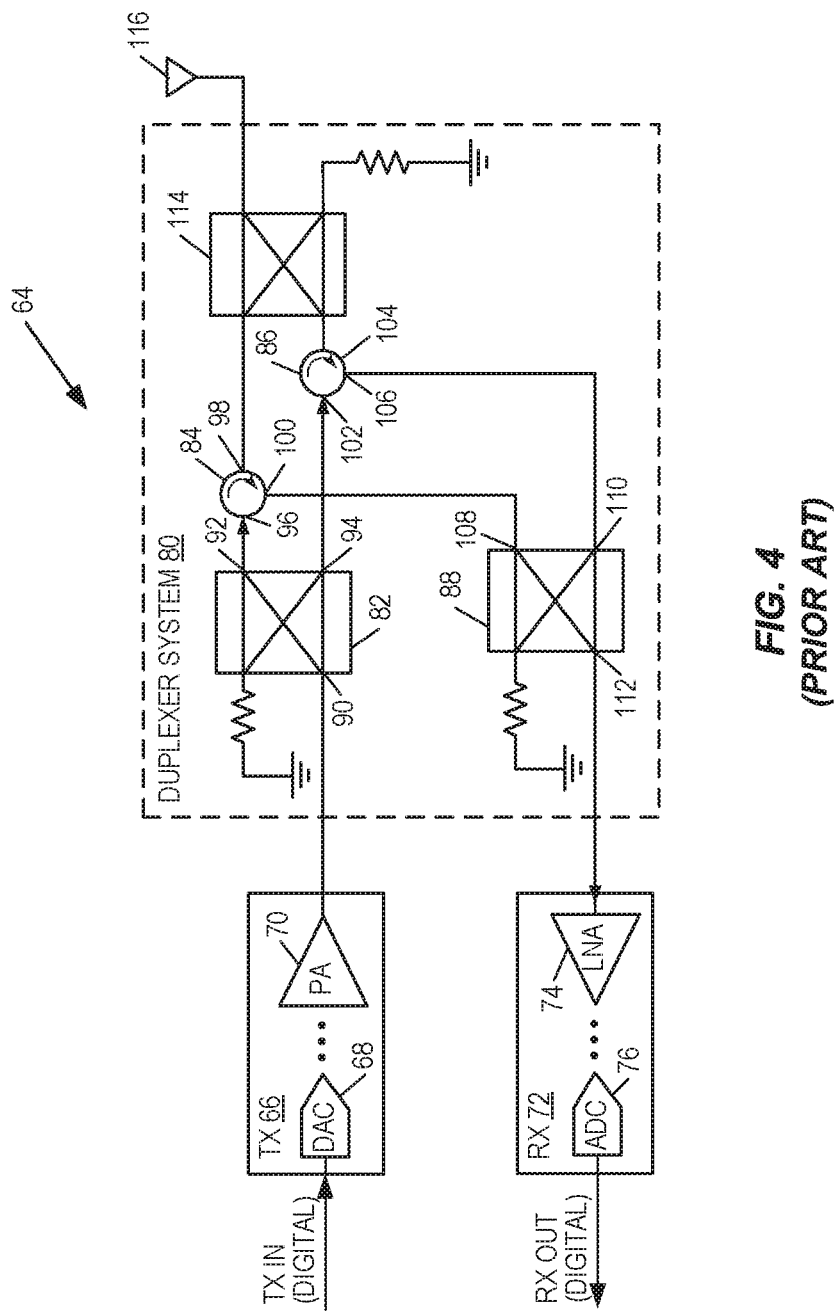
FIG. 4 illustrates a radio system including a duplexer system similar to that of FIG. 3.

As discussed below, the RF transmit signals pass through the duplex filters 152 and 154, respectively, and are constructively combined at the third port 180 of the hybrid coupler 156. Note that, as used herein, signals constructively combine when, after combining, a magnitude of the combined signal is greater than that of the maximum of the signals prior to combining. Further, when two signals are perfectly balanced (i.e., have the same magnitude and group delay) and are perfectly in-phase (i.e., exactly 0° phase difference), perfect, or ideal, constructive combining will occur. However, constructive combining is still achieved, but to a lesser extent, when the two signals are not perfectly balanced and/or are not exactly in-phase with one another. Because the RF transmit signals from the transmitters 120 and 122 constructively combine at the third port 180 of the hybrid coupler 156, unlike the auxiliary transmitter 28 of the radio system 10 of FIG. 1, the transmit power of the transmitter 122 is not wasted (i.e., the transmit power of the transmitter 122 contributes to the total transmit power of the radio system 118).

The RF transmit signals result in transmit leakage signals from the first and second transmit ports 136 and 142 of the duplexer system 128 to the receive port 146 of the duplexer system 128. The digital filter 130 operates such that, together with the phase shifts applied to the RF transmit leakage signals by the hybrid coupler 158, the RF transmit leakage signals are approximately 180° out-of-phase and have approximately the same magnitude and group delay at the third port 182 of the hybrid coupler 158. As a result, the RF transmit leakage signals destructively combine at the third port 182 of the hybrid coupler 158, which thereby mitigates transmitter leakage and improves the isolation of the duplexer system 128. As used herein, signals "destructively combine" when, after combining, a magnitude of the combined signal is less than a magnitude of the maximum of the signals prior to combining. When two signals are perfectly balanced (i.e., have same magnitude and group delay) and are exactly 180° out-of-phase with one another, ideal or perfect destructive combining is achieved.

However, destructive combining is still achieved, but to a lesser extent, when the two signals are not perfectly balanced and/or are not exactly 180° out-of-phase with one another. Notably, by combining the two RF transmit leakage signals in the RF domain, the transmitter leakage is suppressed prior to going through the LNA 148. Otherwise, the transmitter leakage could cause non-linear behavior in the LNA 148 and desensitize the receiver 124.

For reception, an RF receive signal is received at the antenna 126. The RF receive signal is then passed through the hybrid coupler 156, the duplex filters 152 and 154, and the hybrid coupler 158 to provide an RF receive signal at the receive port 146 of the duplexer system 128. Due to the destructive combining of the two RF transmit leakage signals at the receive port 146 of the duplexer system 128, transmitter leakage to the input of the receiver 124 during reception of the RF receive signal is mitigated.

Figure 6A:
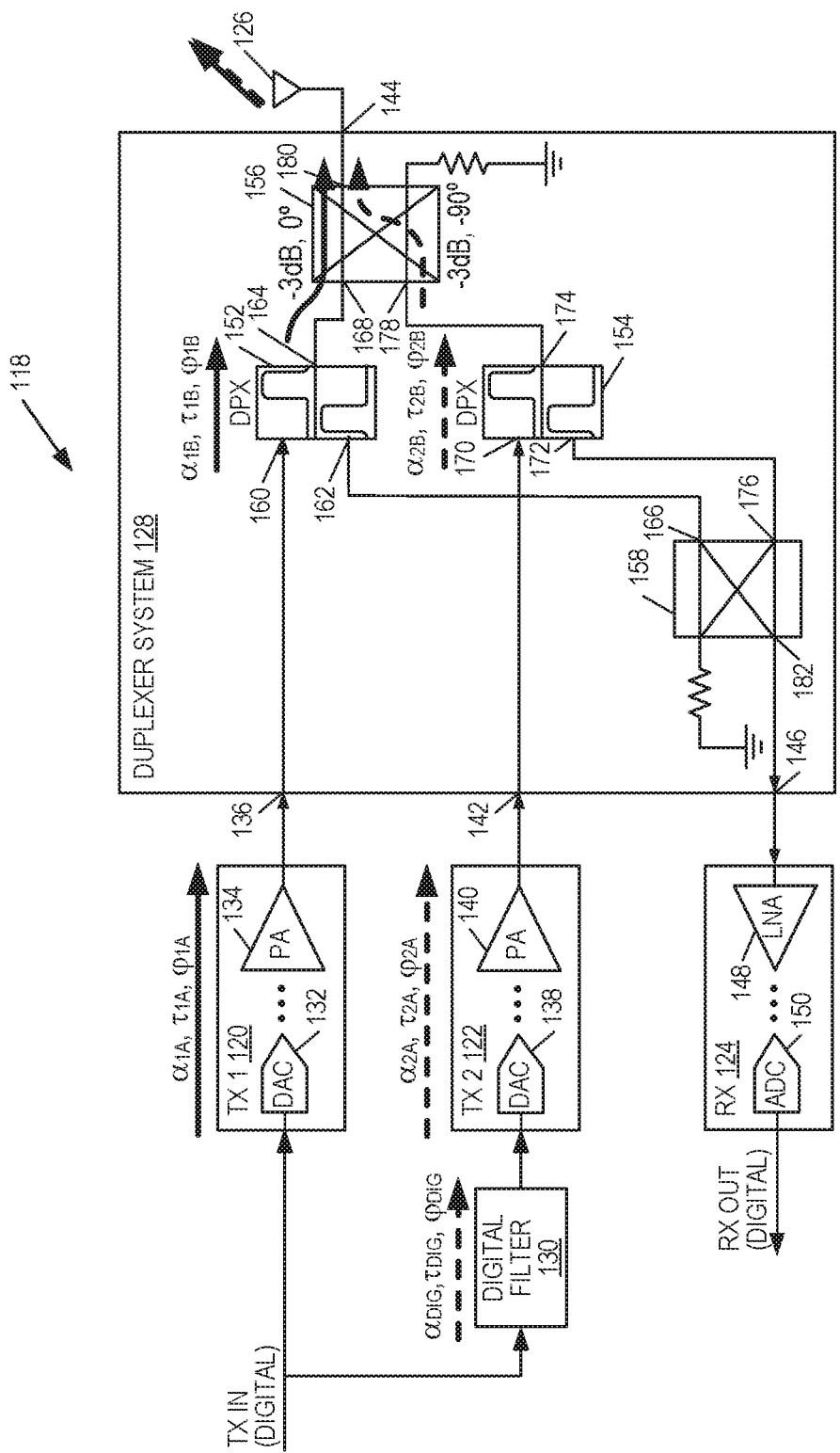
FIGS. 6A through 6C illustrate the operation of the radio system of FIG. 5 according to one embodiment of the present disclosure.

The operation of the radio system 118 will now be described in more detail with respect to FIGS. 6A through 6C. As illustrated in FIG. 6A, the transmitter 120 has a gain ($\alpha_{1A}$), a group delay ($\tau_{1A}$), and a phase ($\varphi_{1A}$); the transmitter 122 has a gain ($\alpha_{2A}$), a group delay ($\tau_{2A}$), and a phase ($\varphi_{2A}$); the transmit path through the duplex filter 152 has a gain ($\alpha_{1B}$), a group delay ($\tau_{1B}$), and a phase ($\varphi_{1B}$); the transmit path through the duplex filter 154 has a gain ($\alpha_{2B}$), a group delay ($\tau_{2B}$), and a phase ($\varphi_{2B}$); and the digital filter 130 has a gain ($\alpha_{DIG}$), a group delay ($\tau_{DIG}$), and a phase ($\varphi_{DIG}$). The phase shift ($\varphi$) is the residual phase shift after the nominal group delay is removed from the phase response. For the discussion below, it is assumed that all of the components exhibit wideband properties (i.e., constant gain and group delay over the relevant frequency range). Thus, the gains ($\alpha$)

and group delays (τ) are assumed to be frequency independent over the relevant frequency band.

FIG. 6A illustrates the in-phase or constructive combining of the RF transmit signals output by the transmitters 120 and 122 according to one embodiment of the present disclosure. In operation, the digital input signal is processed by the transmitter 120 to provide the first RF transmit signal. The first RF transmit signal passes through the duplex filter 152 to the first port 168 of the hybrid coupler 156. Similarly, the digital input signal is processed by the digital filter 130 and the transmitter 122 to provide the second RF transmit signal. The second RF transmit signal passes through the duplex filter 154 to the second port 178 of the hybrid coupler 156. At the hybrid coupler 156, the first RF transmit signal is passed from the first port 168 of the hybrid coupler 156 to the third port 180 of the hybrid coupler 156 with an approximately 0° phase shift, and the second RF transmit signal is passed from the second port 178 of the hybrid coupler 156 to the third port 180 of the hybrid coupler 156 with an approximately −90° phase shift. Ideally, the phase shifts are exactly 0° and −90°, respectively. However, due to, e.g., manufacturing tolerances, the phase shifts may not be exactly equal to 0° and −90° (i.e., are only approximately equal to 0° and −90°). Since the two RF transmit signals are correlated, there is no −3 Decibel (dB) insertion loss.

In order for the RF transmit signals to constructively combine at the third port 180 of the hybrid coupler 156 (which corresponds to the antenna port 144 of the duplexer system 128), the RF transmit signals should ideally be in-phase and have equal magnitudes and group delays. Assuming perfect 0° and −90° phase shifts in the hybrid coupler 156, for the RF transmit signals to be in-phase and have equal magnitudes at the antenna 126, the following equalities should be satisfied:

$$\varphi_{1A}+\varphi_{1B}+0°=\varphi_{DIG}+\varphi_{2A}+\varphi_{2B}-90°, \quad (1)$$

$$\tau_{1A}+\tau_{1B}=\tau_{DIG}+\tau_{2A}+\tau_{2B}, \text{ and} \quad (2)$$

$$\alpha_{1A}+\alpha_{1B}-3 \text{ dB}=\alpha_{DIG}+\alpha_{2A}+\alpha_{2B}-3 \text{ dB}, \quad (3)$$

where the gain values (α) are expressed in terms of dB. Ideally, the components of the transmitters 120 and 122 and the components of the duplexer system 128 are all matched between both transmit paths (i.e., $\alpha_{1A}=\alpha_{2A}$, $\varphi_{1A}=\varphi_{2A}$, $\tau_{1A}=\tau_{2A}$, $\alpha_{1B}=\alpha_{2B}$, $\varphi_{1B}=\varphi_{2B}$, and $\tau_{1B}=\tau_{2B}$). In this case, $\alpha_{DIG}=0$, $\tau_{DIG}=0$, and $\varphi_{DIG}=+90°$. Alternatively, the group delay ($\tau_{DIG}$) of the digital filter 130 can be larger if an equivalent group delay is added to the other path (e.g., by digital delay(s)). However, in implementation, the components of the transmitters 120 and 122 and the components of the duplexer system 128 may not be perfectly matched between both transmit paths. In this case, the gain ($\alpha_{DIG}$), the group delay ($\tau_{DIG}$), and/or the phase ($\varphi_{DIG}$) may vary from the ideal case given above.

Figure 6B:
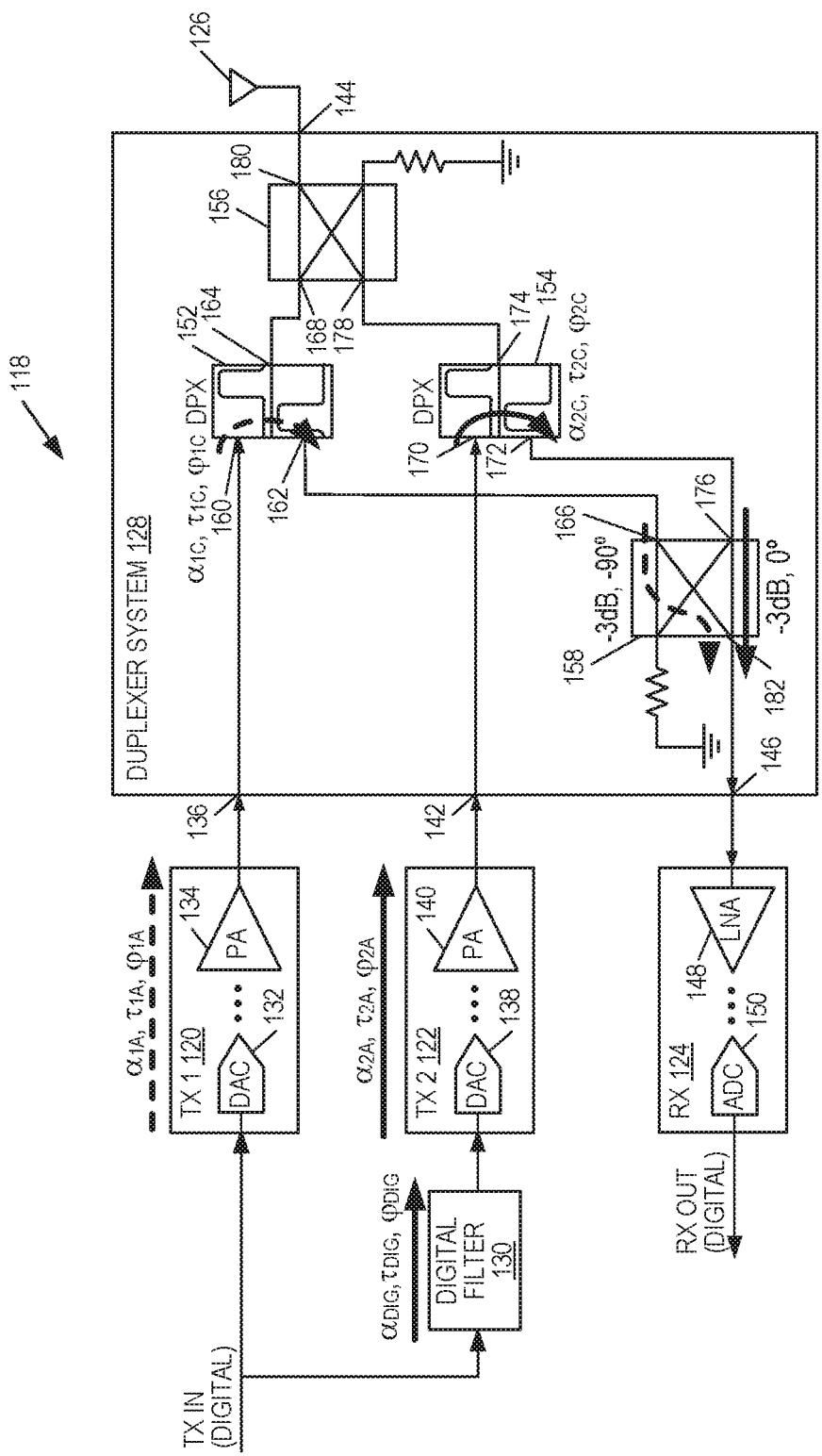

FIG. 6B illustrates the destructive combining of the first and second RF transmit leakage signals at the receive port 146 of the duplexer system 128 according to one embodiment of the present disclosure. As illustrated, a leakage path from the transmit port 160 of the duplex filter 152 to the receive port 162 of the duplex filter 152 can be characterized by a gain ($\alpha_{1C}$), a group delay ($\tau_{1C}$), and a phase ($\varphi_{1C}$). Likewise, a leakage path from the transmit port 170 of the duplex filter 154 to the receive port 172 of the duplex filter 154 can be characterized by a gain ($\alpha_{2C}$), a group delay ($\tau_{2C}$), and a phase ($\varphi_{2C}$). Again, for the discussion below, it is assumed that all of the components exhibit wideband properties (i.e., constant gain and group delay over the relevant frequency range). Thus, the gains and group delays for the leakage paths are assumed to be frequency independent over the relevant frequency band(s).

During transmission, a portion of the first RF transmit signal leaks from the transmit port 160 of the duplex filter 152 to the receive port 162 of the duplex filter 152. This portion of the first RF transmit signal is referred to as the first RF transmit leakage signal. The first RF transmit leakage signal enters the first port 166 of the hybrid coupler 158 along with the desired RF receive signal from the receive port 162 of the duplex filter 152. In a similar manner, a portion of the second RF transmit signal leaks from the transmit port 170 of the duplex filter 154 to the receive port 172 of the duplex filter 154. This portion of the second RF transmit signal is referred to as the second RF transmit leakage signal. The second RF transmit leakage signal enters the second port 176 of the hybrid coupler 158 along with the desired RF receive signal from the receive port 172 of the duplex filter 154.

At the hybrid coupler 158, the first RF transmit leakage signal passes from the first port 166 of the hybrid coupler 158 to the third port 182 of the hybrid coupler 158 with an approximately −90° phase shift, and the second RF transmit leakage signal passes from the second port 176 of the hybrid coupler 158 to the third port 182 of the hybrid coupler 158 with an approximately 0° phase shift. Ideally, the phase shifts are exactly −90° and 0°, respectively. However, due to, e.g., manufacturing tolerances, the phase shifts may not be exactly equal to −90° and 0° (i.e., are only approximately equal to −90° and 0°).

In order for the RF transmit leakage signals to destructively combine at the third port 182 of the hybrid coupler 158 (which corresponds to the receive port 146 of the duplexer system 128), the RF transmit leakage signals should ideally be 180° out-of-phase and have equal magnitudes and group delays. Assuming perfect 0° and −90° phase shifts in the hybrid coupler 158, for the RF transmit leakage signals to be 180° out-of-phase and have equal magnitudes and group delays at the third port 182 of the hybrid coupler 158, the following equalities should be satisfied:

$$|(\varphi_{1A}+\varphi_{1C}-90°)-(\varphi_{DIG}+\varphi_{2A}+\varphi_{2C}+0°)|=180°, \quad (4)$$

$$\tau_{1A}+\tau_{1C}=\tau_{DIG}+\tau_{2A}+\tau_{2C}, \text{ and} \quad (5)$$

$$\alpha_{1A}+\alpha_{1C}-3 \text{ dB}=\alpha_{DIG}+\alpha_{2A}+\alpha_{2C}-3 \text{ dB}, \quad (6)$$

where the gain values (α) are expressed in terms of dB. Ideally, the components of the transmitters 120 and 122 and the components of the duplexer system 128 are all matched between both transmit paths (i.e., $\alpha_{1A}=\alpha_{2A}$, $\varphi_{1A}=\varphi_{2A}$, $\tau_{1A}=\tau_{2A}$, $\alpha_{1C}=\alpha_{2C}$, $\varphi_{1C}=\varphi_{2C}$, and $\tau_{1C}=\tau_{2C}$). In this case, in order for the RF transmit leakage signals to be 180° out-of-phase and have equal magnitudes and group delays, $\alpha_{DIG}=0$, $\tau_{DIG}=0$, and $\varphi_{DIG}=+90°$. Alternatively, the group delay ($\tau_{DIG}$) of the digital filter 130 can be larger if an equivalent group delay is added to the other path (e.g., by digital delay(s)). However, in implementation, the components of the transmitters 120 and 122 and the components of the duplexer system 128 may not be perfectly matched between both transmit paths. In this case, the gain ($\alpha_{DIG}$), the group delay ($\tau_{DIG}$), and/or the phase ($\varphi_{DIG}$) may vary from the ideal case given above.

Note that in the non-ideal case, perfect constructive combining of the RF transmit signals according to Equations (1)-(3) and perfect destructive combining of the RF transmit leakage signals according to Equations (4)-(6) cannot occur simultaneously. In other words, if the gain ($\alpha_{DIG}$), the group delay ($\tau_{DIG}$), and/or the phase ($\varphi_{DIG}$) of the digital filter 130 are configured to provide perfect (or nearly perfect) constructive combining of the two RF transmit signals at the antenna port 144 of the duplexer system 128, then the destructive combining of the two RF transmit leakage signals at the receive port 146 of the duplexer system 128 will not be perfect (i.e., there will be some degradation of the transmitter leakage mitigation as opposed to the transmitter leakage mitigation when there is perfect or near perfect destructive combining of the RF transmitter leakage signals). Conversely, if the gain ($\alpha_{DIG}$), the group delay ($\tau_{DIG}$), and/or the phase ($\varphi_{DIG}$) of the digital filter 130 are configured to provide perfect (or nearly perfect) destructive combining of the two RF transmit leakage signals at the receive port 146 of the duplexer system 128, then the constructive combining of the two RF transmit signals at the antenna port 144 of the duplexer system 128 will not be perfect (i.e., there will be some degradation of the combined RF transmit signal as combined to perfect or near perfect constructive combining). As discussed below, in one embodiment, the gain ($\alpha_{DIG}$), the group delay ($\tau_{DIG}$), and/or the phase ($\varphi_{DIG}$) of the digital filter 130 are configured to provide perfect (or nearly perfect) destructive combining of the two RF transmit leakage signals at the receive port 146 of the duplexer system 128.

Figure 6C:
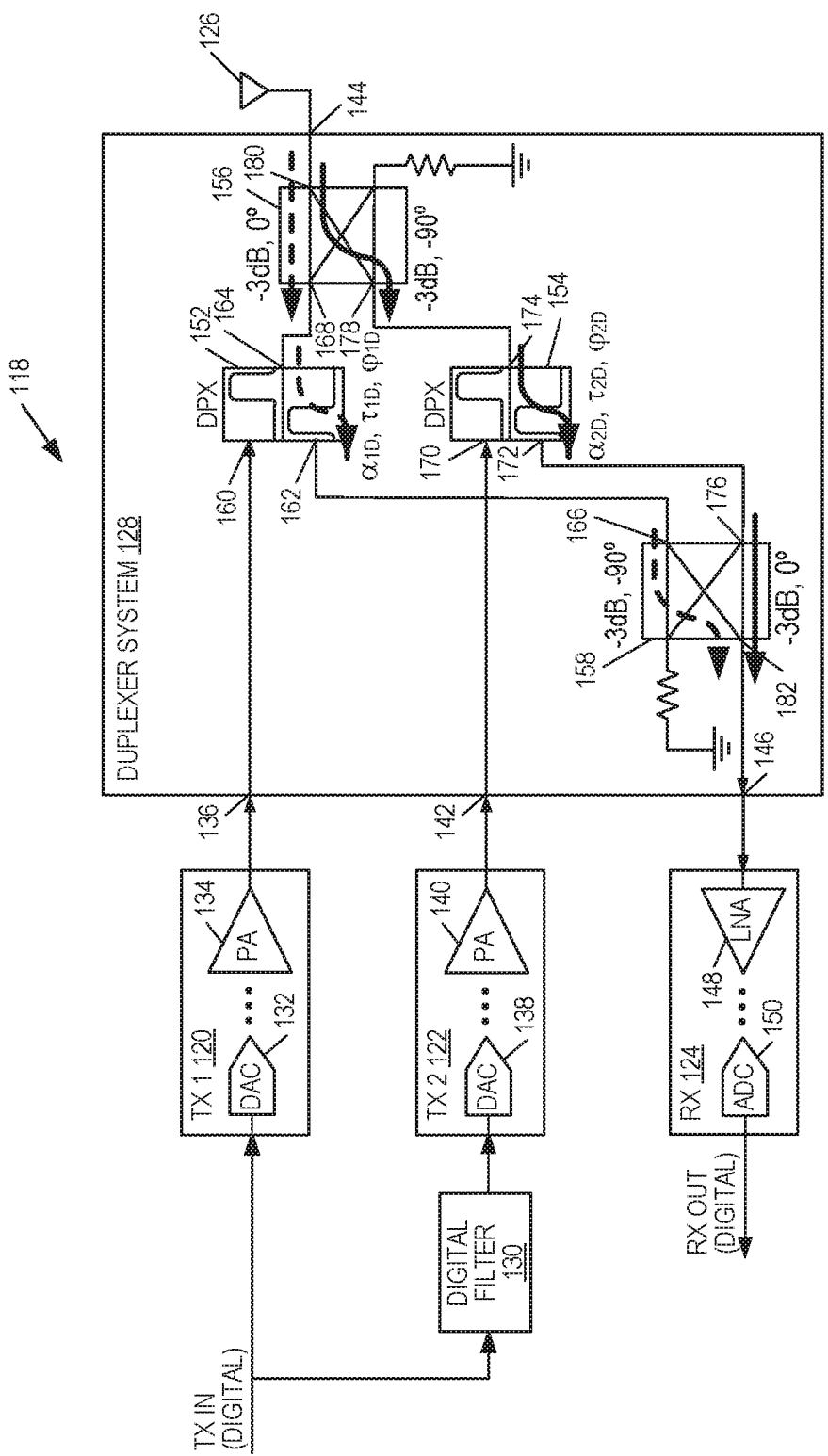

FIG. 6C illustrates the proper reception of a desired RF receive signal according to one embodiment of the present disclosure. In FIG. 6C, the receive path through the duplex filter 152 is characterized by a gain ($\alpha_{1D}$), a group delay ($\tau_{1D}$), and a phase ($\varphi_{1D}$). Likewise, the receive path through the duplex filter 154 is characterized by a gain ($\alpha_{2D}$), a group delay ($\tau_{2D}$), and a phase ($\varphi_{2D}$). Again, for the discussion below, it is assumed that all of the components exhibit wideband properties (i.e., constant gain and group delay over the relevant frequency range). Thus, the gains and group delays for the receive paths are assumed to be frequency independent over the relevant frequency band(s).

During reception, an RF receive signal is received at the antenna port 144 of the duplexer system 128 from the antenna 126. This RF receive signal is referred to as an initial RF receive signal. The initial RF receive signal is passed from the third port 180 of the hybrid coupler 156 to the first port 168 of the hybrid coupler 156 with an approximately 0° phase shift to provide a first RF receive signal and passed from the third port 180 of the hybrid coupler 156 to the second port 178 of the hybrid coupler 156 with an approximately −90° phase shift to provide a second RF receive signal. Again, ideally, the phase shifts are exactly 0° and −90°. However, due to, e.g., manufacturing tolerances, the phase shifts may not be exactly equal to 0° and −90° (i.e., are only approximately equal to 0° and −90°). The first RF receive signal is passed from the antenna port 164 of the duplex filter 152 to the receive port 162 of the duplex filter 152, and the second RF receive signal is passed from the antenna port 174 of the duplex filter 154 to the receive port 172 of the duplex filter 154. From the duplex filter 152, the first RF receive signal is passed to the first port 166 of the hybrid coupler 158. Similarly, the second RF receive signal is passed to the second port 176 of the hybrid coupler 158.

At the hybrid coupler 158, the first RF receive signal is passed from the first port 166 of the hybrid coupler 158 to the third port 182 of the hybrid coupler 158 with an approximately −90° phase shift, and the second RF receive signal is passed from the second port 176 of the hybrid coupler 158 to the third port 182 of the hybrid coupler 158 with an approximately 0° phase shift. Due to the phase shift of the second RF receive signal by approximately −90° by the hybrid coupler 156 and the phase shift of the first RF receive signal by approximately −90° by the hybrid coupler 158, the first and second RF receive signals are in-phase at the third port 182 of the hybrid coupler 158 and therefore constructively combine. More specifically, in order for the RF receive signals to constructively combine at the third port 182 of the hybrid coupler 158 (which corresponds to the receive port 146 of the duplexer system 128), the RF receive signals should be in-phase. For the RF receive signals to be in-phase at the third port 182 of the hybrid coupler 158, the following equality should be satisfied:

$$(0°+\varphi_{1D}90°)-(-90°+\varphi_{2D}+0°)=0°. \quad (7)$$

Ideally, the duplex filters 152 and 154 are well-matched (i.e., $\alpha_{1D}=\alpha_{2D}$, $\varphi_{1D}=\varphi_{2D}$, and $\tau_{1D}=\tau_{2D}$). The magnitudes and group delays of the receive paths are constant. So, based on Equation (7), the two RF receive signals constructively combine at the third port 182 of the hybrid coupler 158, which corresponds to the receive port 146 of the duplexer system 128.

FIGS. 6A through 6C show that the RF transmitter leakage signals can be destructively combined at the receive port 146 of the duplexer system 128 while constructively combining the desired RF transmit signals at the antenna port 144 of the duplexer system 128 and while also allowing proper reception of the desired RF receive signal. As discussed above, in the ideal case, this can be done by configuring the digital filter 130 to have a transfer function characterized by $\alpha_{DIG}=0$, $\tau_{DIG}=0$, and $\varphi_{DIG}=+90°$. However, in the non-ideal case experienced in real-world implementations, the components of the transmitters 120 and 122 and/or the components of the duplexer system 128 (e.g., the duplex filters 152 and 154) are not perfectly matched (i.e., $\alpha_{1A}\neq\alpha_{2A}$, or $\varphi_{1A}\neq\varphi_{2A}$, or $\tau_{1A}\neq\tau_{2A}$, or $\alpha_{1B}\neq\alpha_{2B}$, or $\varphi_{1B}\neq\varphi_{2B}$, or $\tau_{1B}\neq\tau_{2B}$, or $\alpha_{1C}\neq\alpha_{2C}$, or $\varphi_{1C}\neq\varphi_{2C}$, or $\tau_{1C}\neq\tau_{2C}$, or $\alpha_{1D}\neq\alpha_{2D}$, or $\varphi_{1D}\neq\varphi_{2D}$, or $\tau_{1D}\neq\tau_{2D}$). Further, the hybrid couplers 156 and 158 may not provide exactly 0° and −90° phase shifts and may not have perfectly matched −3 dB loss in each path. The digital filter 130 provides the flexibility to compensate for these errors and, in some embodiments, antenna reflections.

For example, consider a scenario where the phase shifts in the hybrid coupler 158 are 0° and −88° instead of the ideal case of 0° and −90°, but the hybrid coupler 156 has phase shifts of 0° and −90°. In this scenario, it may be desirable to tune the digital filter 130 to cause maximum cancellation of the transmitter leakage. So, from FIG. 6B, in order for the phase difference between the RF transmit leakage signals at the third port 182 of the hybrid coupler 158 to be 180°, the following equality should be satisfied:

$$|(\varphi_{1A}30\ \varphi_{1C}-88°)-(\varphi_{DIG}+\varphi_{2A}+\varphi_{2C}+0°)=180°.$$

If the transmitters 120 and 122 and the duplex filters 152 and 154 are assumed to be perfectly matched (i.e., $\alpha_{1A}=\alpha_{2A}$, $\varphi_{1A}=\varphi_{2A}$, $\tau_{1A}=\tau_{2A}$, $\alpha_{1B}=\alpha_{2B}$, $\varphi_{1B}=\varphi_{2B}$, and $\tau_{1B}=\tau_{2B}$), then this equality can be satisfied by calibrating the digital filter 130 such that the phase shift $\varphi_{DIG}$ applied by the digital filter 130 is 92°. With this digital phase shift, the two RF transmit signals will not constructively combine at the antenna port 144 of the duplexer system 128 in the ideal manner (i.e., the two RF transmit signals will not be perfectly in-phase at the antenna port 144 of the duplexer system 128). From FIG. 6A, it can be determined that the phase difference between the two RF transmit signals at the antenna port 144 of the duplexer system 128 is:

$$(\varphi_{1A}+\varphi_{1B}+0°)-(\varphi_{DIG}+\varphi_{2A}+\varphi_{2B}-90°).$$

Thus, when $\varphi_{DIG}=92°$, then the phase difference between the two RF transmit signals at the antenna port 144 of the duplexer system 128 is 2° instead of the ideal case of 0°. However, the effect of the 2° phase difference means that the combined RF transmit signal will be about 0.001 dB lower than if the phase difference was 0°. Similarly, from FIG. 6C, it can be seen that the phase difference between the two RF receive signals at the third port 182 of the hybrid coupler 158 is also 2°, which means that the desired RF receive signal is also about 0.001 dB lower than if the phase difference was 0°.

The example above is a simple example that shows that the digital filter 130 can be configured to compensate for a non-ideal value of the phase shift of the hybrid coupler 158. However, this example can be followed in a similar fashion to see that the digital filter 130 can compensate for mismatch between the two transmitters 120 and 122 and/or the duplex filters 152 and 154 across the relevant frequency range. In general, the digital filter 130 can be configured to minimize the transmitter leakage and, in some embodiments, antenna reflections in the transmit frequency band, the receive frequency band, or both the transmit frequency band and the receive frequency band. When there are mismatches between the transmitters 120 and 122, mismatches between the duplex filters 152 and 154, and/or non-ideal phase shifts in the hybrid coupler 158, the minimization of the transmitter leakage via appropriate configuration of the digital filter 130 comes at the expense of lower transmit power or some attenuation of the desired receive signal.

The digital filter 130 (e.g., the coefficients of the digital filter 130) can be calibrated using any suitable technique such as, for example, the filtered-x Least Mean Squared (LMS) algorithm, which is described in S. J. Elliott et al., "Active noise control," IEEE Signal Processing Magazine, October 1993, pages 12-35. The digital filter 130 may be calibrated once, e.g., during manufacturing or dynamically calibrated during operation. The calibration may be performed by an external system (e.g., during manufacturing) or calibrated by an associated adaptor (e.g., a hardware adaptor included in the radio system 118 or a processor included in or otherwise associated with the radio system 118 that executes software that instructs the processor to perform the calibration process).

In one embodiment, the digital filter 130 is calibrated to minimize the transmit leakage in the transmit frequency band and, in some embodiments, antenna reflections. By calibrating the digital filter 130 to minimize the transmit leakage in the transmit frequency band, the digital filter 130 applies values for the digital phase shift $\varphi_{DIG}$, the gain $\alpha_{DIG}$, and the group delay $\tau_{DIG}$ that result in the two RF transmit leakage signals at the third port 182 of the hybrid coupler 158 having, as nearly as possible, the same magnitude and group delay and a phase difference of 180°. By doing so, the two RF transmit leakage signals destructively combine in such a manner that the transmit leakage is minimized. In addition, if there are antenna reflections, the digital filter 130 may be calibrated to compensate for both transmit leakage and antenna reflections. More specifically, the antenna reflections appear at the receive port 146 of the duplexer system 128 as additional transmitter leakage. Then, by calibrating the digital filter 130 to minimize the transmitter leakage at the receive port 146 (which includes both the transmitter leakage from the first and second transmit ports 136 and 142 to the receive port 146 as well as antenna reflections from the antenna port 144 to the receive port 146), both transmitter leakage and antenna reflections are mitigated.

In another embodiment, that the digital filter 130 is calibrated to minimize the transmit leakage in the receive frequency band, where in this case the transmit leakage more specifically includes Intermodulation Distortion (IMD) and/or noise within the receive frequency band. More specifically, if the two transmitters 120 and 122 are closely matched, then their non-linear distortion and in-band noise due to phase noise are highly correlated. If this is the case, then the non-linear distortion and in-band phase noise that leak through the duplex filters 152 and 154 can also experience some destructive combining. Notably, to cancel distortion, the digital filter 130 should compensate for imbalance between the two transmitters 120 and 122, and not the imbalance that follows the power amplifier (i.e., the imbalance between the duplex filters 152 and 154, and non-ideal hybrid couplers). This could be done by, e.g., measuring the frequency response of the transmitters 120 and 122 with measurement equipment, and then using a standard digital filter synthesis technique to match to compensate for the imbalance. In doing so, the transmit band signals are calibrated so they generate the same receive band distortion at the source of the non-linearity. In yet another embodiment, the digital filter 130 is calibrated to minimize the transmit leakage across both the transmit frequency band and the receive frequency band. Note that to minimize transmitter leakage across both the transmit frequency band and the receive frequency band, both bands cannot be optimized simultaneously. As such, there is a trade-off between the desired amount of cancellation in each band.

Figure 7:
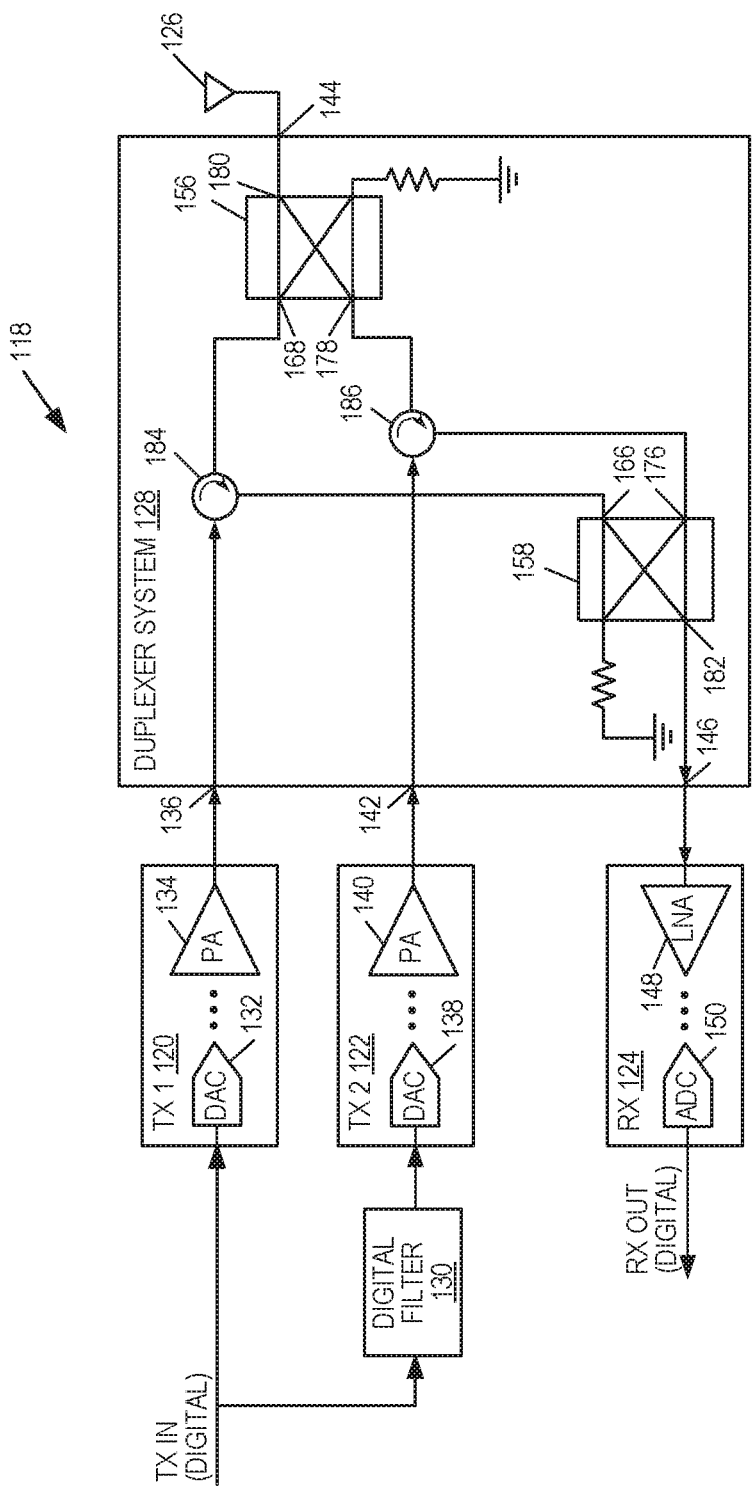
FIG. 7 illustrates the radio system of FIG. 5 according to another embodiment of the present disclosure.

FIG. 7 illustrates the radio system 118 according to another embodiment of the present disclosure. This embodiment is substantially the same as that of FIG. 5 but where the duplex filters 152 and 154 are replaced with circulators 184 and 186. Otherwise, the radio system 118 operates as described above.

Figure 8:
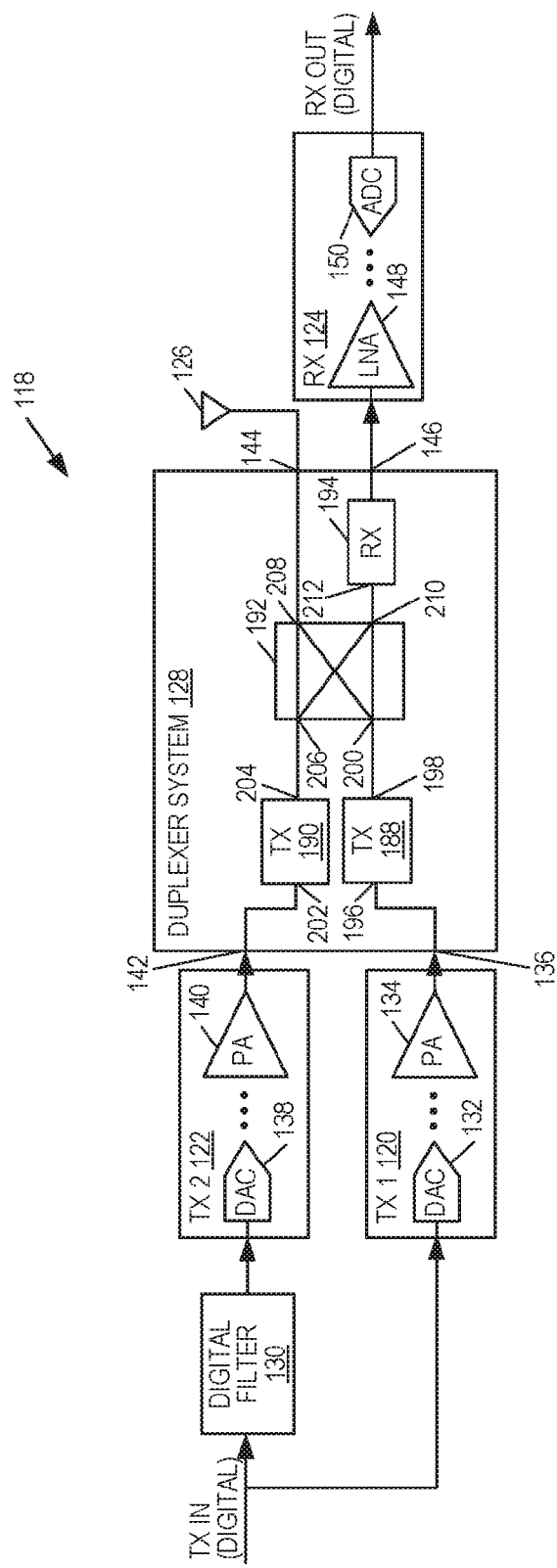
FIG. 8 illustrates a radio system including a duplexer system and an associated digital filter that operate together to provide improved isolation according to another embodiment of the present disclosure.

FIG. 8 illustrates the radio system 118 according to yet another embodiment of the present disclosure. In this embodiment, the duplexer system 128 utilizes an architecture that is different than that described above. In particular, the duplexer system 128 includes transmit filters 188 and 190, a hybrid coupler 192, and a receive filter 194. In the ideal case where the transmitters 120 and 122 are perfectly matched (i.e., $\alpha_{1A}=\alpha_{2A}$, $\varphi_{1A}=\varphi_{2A}$, and $\tau_{1A}=\tau_{2A}$), the transmit filters 188 and 190 are perfectly matched (i.e., the same gain, phase, and group delay), and the hybrid coupler 192 applies phase shifts of exactly 0° and −90°, the digital filter 130 is configured to apply a −90° phase shift (i.e., $\varphi_{DIG}=-90°$, $\alpha_{DIG}=0$, and $\tau_{DIG}=0$). Alternatively, the group delay ($\tau_{DIG}$) of the digital filter 130 can be larger if an equivalent group delay is added to the other path (e.g., by digital delay(s)). In this ideal case, the two RF transmit signals output by the transmitters 120 and 122 have the same magnitude and group delay, but the RF transmit signal output by the transmitter 122 has a phase shift of −90° relative to the RF transmit signal output by the transmitter 120.

The first RF transmit signal is provided to an input port 196 of the transmit filter 188, which corresponds to the first transmit port 136 of the duplexer system 128. The first RF transmit signal is then filtered by the transmit filter 188 and then provided from an output port 198 of the transmit filter 188 to a first port 200 of the hybrid coupler 192. In a similar manner, the second RF transmit signal is provided to an input port 202 of the transmit filter 190, which corresponds to the second transmit port 142 of the duplexer system 128. The second RF transmit signal is then filtered by the transmit filter 190 and then provided from an output port 204 of the transmit filter 190 to a second port 206 of the hybrid coupler 192. At the hybrid coupler 192, the first RF transmit signal is passed from the first port 200 of the hybrid coupler 192 to a third port 208 of the hybrid coupler 192 with a −90° phase shift, and the second RF transmit signal is passed from the second port 206 of the hybrid coupler 192 to the third port 208 of the hybrid coupler 192 with a 0° phase shift. The third port 208 of the hybrid coupler 192 corresponds to the antenna port 144 of the duplexer system 128. Due to the −90° phase shift of the second RF transmit signal caused by the digital filter 130 and the −90° phase shift of the first RF transmit signal caused by the hybrid coupler 192, the two RF transmit signals are in-phase at the third port 208 of the hybrid coupler 192, and thus the antenna port 144 of the duplexer system 128, and therefore constructively combine.

As for transmitter leakage, a portion of the first RF transmit signal passes from the first port 200 of the hybrid coupler 192 to a fourth port 210 of the hybrid coupler 192 with a 0° phase shift, and a portion of the second RF transmit signal passes from the second port 206 of the hybrid coupler 192 to the fourth port 210 of the hybrid coupler 192 with a −90° phase shift. These signals are referred to as first and second RF transmit leakage signals, respectively. The fourth port 210 of the hybrid coupler 192 is coupled to an input port 212 of the receive filter 194. Due to the −90° phase shift of the second RF transmit leakage signal caused by the digital filter 130 and the additional −90° phase shift of the second RF transmit leakage signal caused by the hybrid coupler 192, the two RF transmit leakage signals are 180° out-of-phase at the fourth port 210 of the hybrid coupler 192 and therefore destructively combine before entering the receiver 124 through the receive filter 194.

During reception, the initial RF receive signal received at the antenna 126 is passed from the third port 208 of the hybrid coupler 192 to the first port 200 of the hybrid coupler 192 with a −90° phase shift and to the second port 206 of the hybrid coupler 192 with a 0° phase shift. The two RF receive signals at the first and second ports 200 and 206 of the hybrid coupler 192 are reflected by the transmit filters 188 and 190, respectively. The first reflected RF receive signal passes from the first port 200 of the hybrid coupler 192 to the fourth port 210 of the hybrid coupler 192 with a 0° phase shift. Conversely, the second reflected RF receive signal passes from the second port 206 of the hybrid coupler 192 to the fourth port 210 of the hybrid coupler 210 with a −90° phase shift. Due to the −90° phase shift of the first RF receive signal caused by the hybrid coupler 192 and the −90° phase shift of the second reflected RF receive signal caused by the hybrid coupler 192, the two reflected RF receive signals are in-phase at the fourth port 210 of the hybrid coupler 192 and therefore constructively combine before entering the receiver 124 via the receive filter 194.

While the discussion above focuses on the ideal scenario, as discussed above with respect to the embodiment of FIG. 5, the transmitters 120 and 122 and/or the transmit filters 188 and 190 may not be perfectly matched and/or the phase shifts applied by the hybrid coupler 192 may vary from the ideal values of 0° and −90°. The digital filter 130 provides the flexibility to compensate for such errors in order to minimize the transmitter leakage (and antenna reflections) and, therefore, maximize the isolation of the duplexer system 128.

Figure 9:
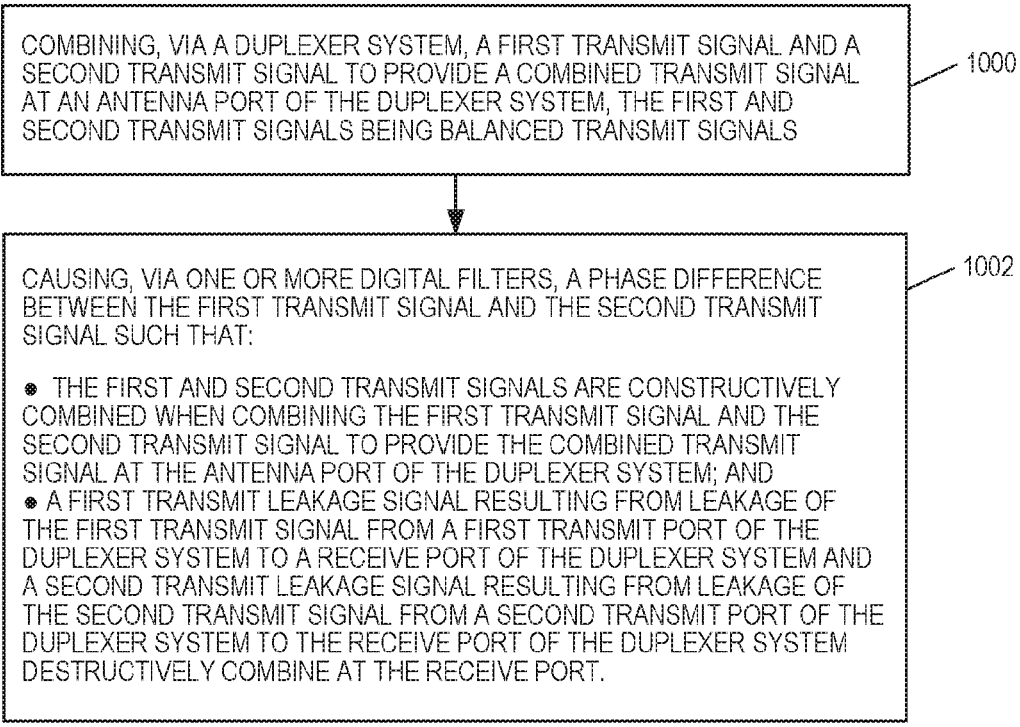
FIG. 9 is a flow chart that illustrates a process for providing improved isolation according to one embodiment of the present disclosure.

FIG. 9 is a flow chart that illustrates a process for improving the isolation of a duplexer system according to one embodiment of the present disclosure. In this example, the duplexer system is the duplexer system 128 described above. However, this process is applicable to any duplexer system that, together with the digital filter 130, is capable of applying the appropriate phase shifts to enable destructive combing of undesired leakage signals and constructive combining of the desired signal(s).

As illustrated, the process includes combining, by the duplexer system 128, a first transmit signal and a second transmit signal to provide a combined transmit signal at the antenna port 144 of the duplexer system 128 (step 1000). The first and second transmit signals are balanced transmit signals in that they have approximately the same magnitudes and group delays, but may, in some embodiments, have some variation in magnitude and/or group delay as introduced by the digital filter 130 to compensate for mismatches within the duplexer system 128. The process further includes causing, via one or more digital filters 130, a phase difference between the first and second transmit signals (and in some embodiments a magnitude and/or a group delay adjustment) such that: (1) the first and second transmit signals are constructively combined when combining the first and second transmit signals to provide the combined transmit signal at the antenna port 144 of the duplexer system 128 and (2) a first transmit leakage signal resulting from leakage of the first transmit signal from the first transmit port 136 of the duplexer system 128 to the receive port 146 of the duplexer system 128 and a second transmit leakage signal resulting from leakage of the second transmit signal from the second transmit port 142 of the duplexer system 128 to the receive port 146 of the duplexer system 128 destructively combine at the receive port 146 (step 1002).

Figure 10:
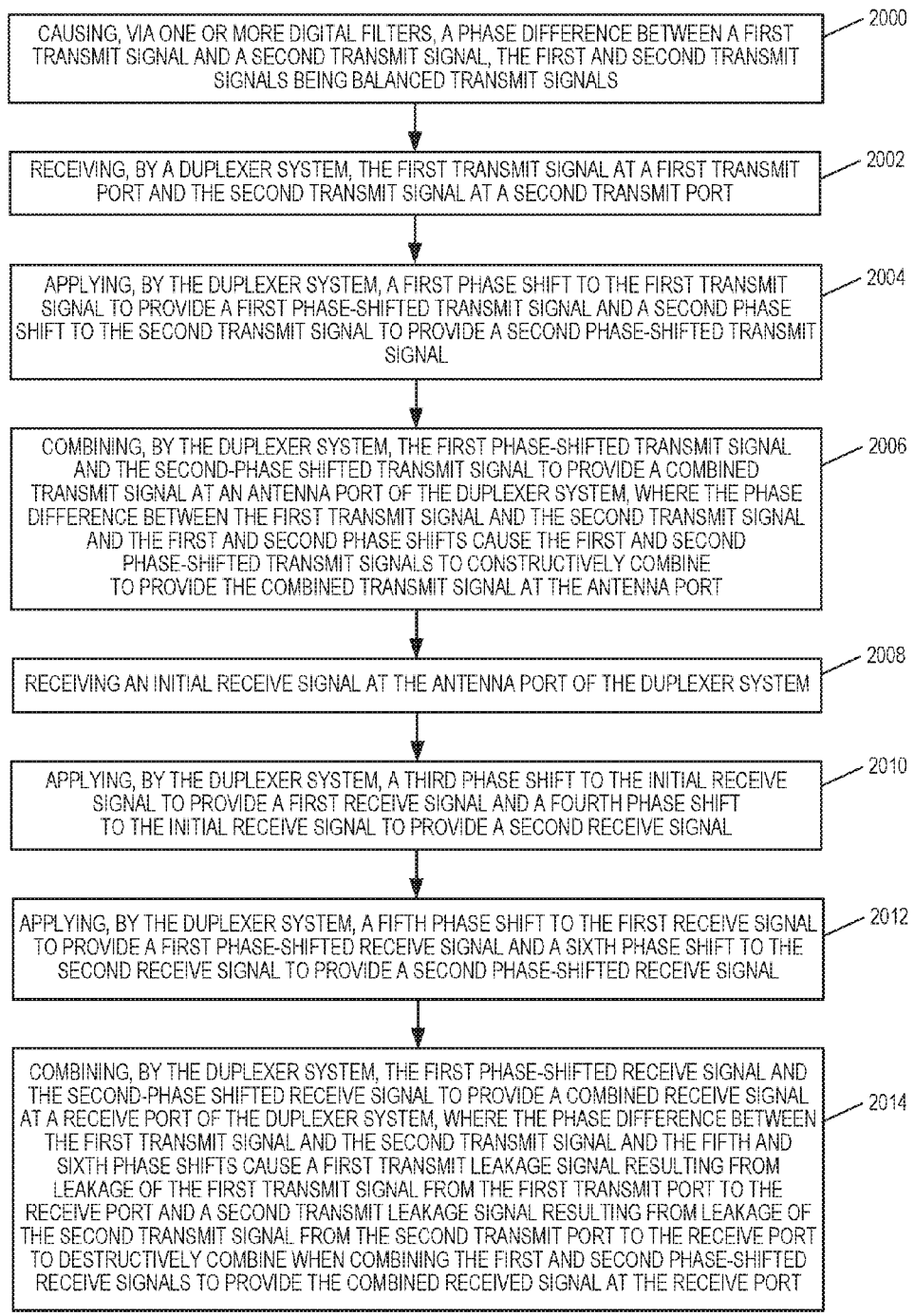
FIG. 10 is a flow chart that illustrates a process for providing improved isolation according to another embodiment of the present disclosure.

FIG. 10 is a flow chart that illustrates a process for improving the isolation of a duplexer system according to another embodiment of the present disclosure. In this example, the duplexer system is the duplexer system 128 described above. However, this process is applicable to any duplexer system that, together with the digital filter 130, is capable of applying the appropriate phase shifts to enable destructive combing of undesired leakage signals and constructive combining of the desired signal(s).

As illustrated, the process includes causing, via one or more digital filters 130, a phase difference between a first transmit signal and a second transmit signal (step 2000). The first and second transmit signals are balanced transmit signals in that they have approximately the same magnitudes and group delays, but may, in some embodiments, have some variation in magnitude and/or group delay as introduced by the digital filter 130 to compensate for mismatches within the duplexer system 128. The process further includes receiving, by the duplexer system 128, the first transmit signal at the first transmit port 136 of the duplexer system 128 and the second transmit signal at the second transmit port 142 of the duplexer system 128 (step 2002). Next, the process includes applying, by the duplexer system 128, a first phase shift to the first transmit signal to provide a first phase-shifted transmit signal and a second phase shift to the second transmit signal to provide a second phase-shifted transmit signal (step 2004). The process further includes combining, by the duplexer system 128, the first and second phase-shifted transmit signals to provide a combined transmit signal at the antenna port 144 of the duplexer system 128 (step 2006). The phase difference between the first and second transmit signals and the first and second phase shifts applied to the first and second transmit signals by the duplexer system 128 are such that the first and second phase-shifted transmit signals constructively combine to provide the combined transmit signal at the antenna port 144 of the duplexer system 128.

In addition, the process includes receiving an initial receive signal at the antenna port 144 of the duplexer system 128 (step 2008) and applying, by the duplexer system 128, a third phase shift and a fourth phase shift to the initial receive signal to provide a first receive signal and a second receive signal, respectively (step 2010). The process further includes applying, by the duplexer system 128, a fifth phase shift to the first receive signal to provide a first phase-shifted receive signal and a sixth phase shift to the second receive signal to provide a second phase-shifted receive signal (step 2012). The process then includes combining, by the duplexer system 128, the first and second phase-shifted receive signals to provide a combined receive signal at the receive port 146 of the duplexer system 128 (step 2014). The phase difference between the first and second transmit signals and the fifth and sixth phase shifts are such that a first transmit leakage signal from the first transmit port 136 to the receive port 146 of the duplexer system 128 resulting from the first transmit signal and a second transmit leakage signal from the second transmit port 142 to the receive port 146 of the duplexer system 128 resulting from the second transmit signal destructively combine at the receive port 146 when combining the first and second phase-shifted receive signals to provide the combined received signal at the receive port 146. Further, the third, fourth, fifth, and sixth phase shifts applied by the duplexer system 128 for the receive path are such that the first and second phase-shifted receive signals constructively combine at the receive port 146 of the duplexer system 128.

Note that while FIGS. 9 and 10 illustrate a number of "steps," it should be noted that the term "steps" is not to be construed as requiring any particular ordering for the performance of the associated actions. In fact, the steps may be performed in any desired order unless a specific order is explicitly stated as being required or is otherwise required for the operation of the processes of FIGS. 9 and 10. Further, some of the steps may be performed simultaneously (e.g., the processing for the transmit path and the receive path are performed simultaneously for simultaneous transmission and reception such as in, e.g., a Frequency Division Duplexing (FDD) system).

For simplicity and ease of discussion, several explanations herein are given in terms of amplitude, phase, and group delay that are considered constant across the relevant frequency range(s). However, in general, the desired amplitude, phase, and group delay will not be constant across the relevant frequency range(s) where cancellation is needed. As the digital filter 130 can have a frequency dependent response, the digital filter 130 can be calibrated to account for variation in the desired amplitude, phase, and group delay across the relevant frequency range(s) where cancellation is desired.

Figure 11:
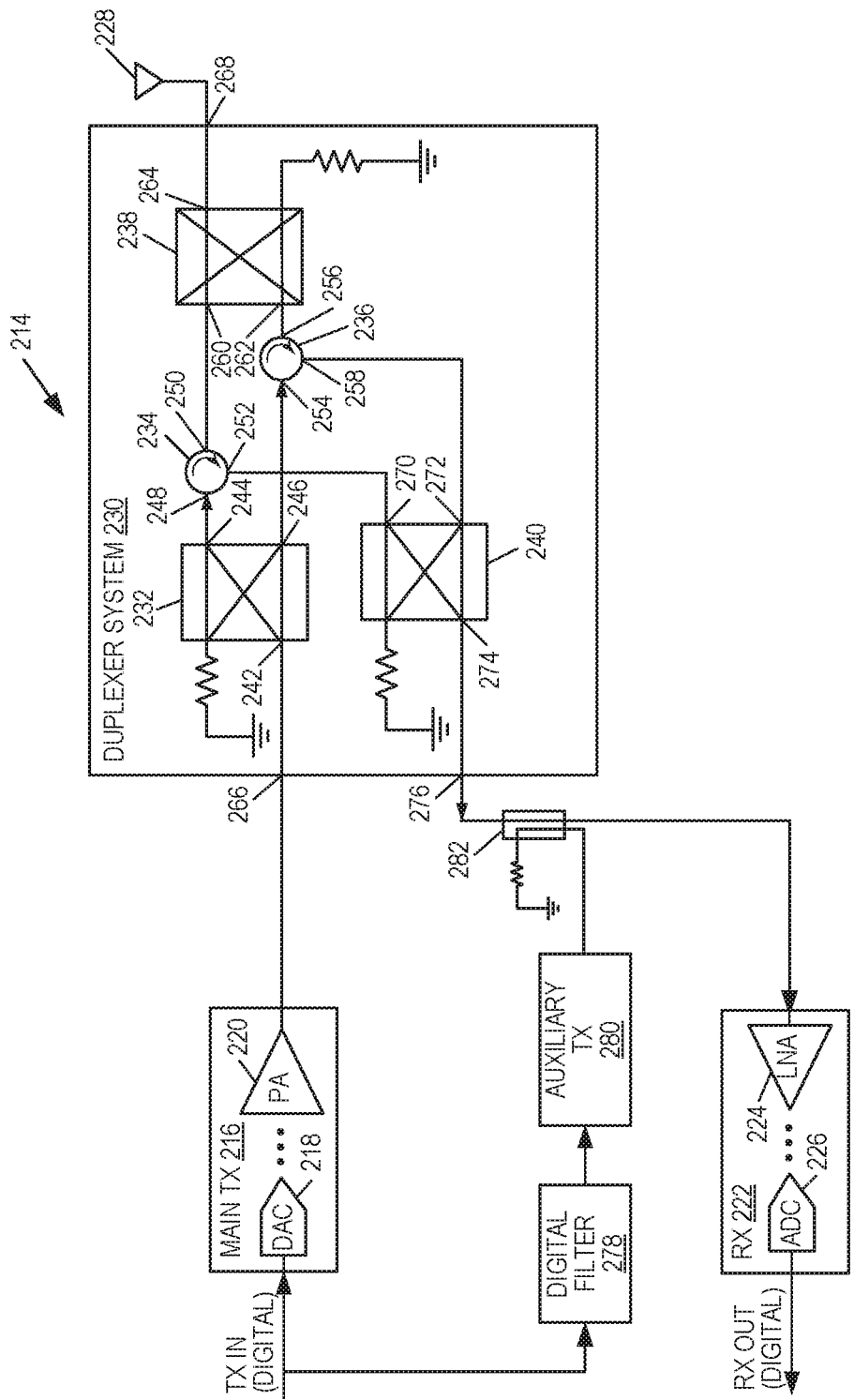
FIG. 11 illustrates a radio system according to yet another embodiment of the present disclosure.

FIG. 11 illustrates a radio system 214 according to another embodiment of the present disclosure. The radio system 214 includes a main transmitter 216 including a DAC 218 and a PA 220, and a receiver 222 including a LNA 224 and an ADC 226. The output of the main transmitter 216 and the input of the receiver 222 are coupled to an antenna 228 via a duplexer system 230. The duplexer system 230 includes a first hybrid coupler 232, circulators 234 and 236, a second hybrid coupler 238, and a third hybrid coupler 240. In operation, an RF transmit signal is output from the main transmitter 216 to a first port 242 of the first hybrid coupler 232. The first hybrid coupler 232 applies an approximately −90° phase shift to the RF transmit signal to provide a first phase-shifted RF transmit signal at a second port 244 of the first hybrid coupler 232 and applies an approximately 0° phase shift to the RF transmit signal to provide a second phase-shifted RF transmit signal at a third port 246 of the first hybrid coupler 232. Ideally, the two phase shifts are exactly −90° and 0°, respectively. However, due to, e.g., manufacturing tolerances, the phase shifts may vary from the ideal case (e.g., −88° and 2°).

The first phase-shifted RF transmit signal is provided to a first port 248 of the circulator 234. Due to the normal operation of the circulator 234, the circulator 234 passes the first phase-shifted RF transmit signal from the first port 248 of the circulator 234 to a second port 250 of the circulator 234. However, a portion of the first phase-shifted RF transmit signal (i.e., a first phase-shifted transmit signal) leaks from the first port 248 of the circulator 234 to a third port 252 of the circulator 234. In a similar manner, the second phase-shifted RF transmit signal is provided to a first port 254 of the circulator 236. Due to the normal operation of the circulator 236, the circulator 236 passes the second phase-shifted RF transmit signal from the first port 254 of the circulator 236 to a second port 256 of the circulator 236. However, a portion of the second phase-shifted RF transmit signal (i.e., a second phase-shifted transmit signal) leaks from the first port 254 of the circulator 236 to a third port 258 of the circulator 236.

In this embodiment, the first and second phase-shifted transmit signals are provided to first and second ports 260 and 262 of the second hybrid coupler 238, respectively. The first phase-shifted transmit signal passes from the first port 260 of the second hybrid coupler 238 to a third port 264 of the second hybrid coupler 238 with an approximately 0° phase shift, and the second phase-shifted transmit signal passes from the second port 262 of the second hybrid coupler 238 to the third port 264 of the second hybrid coupler 238 with an approximately −90° phase shift. The first port 242 of the first hybrid coupler 232 corresponds to a transmit port 266 of the duplexer system 230, and the third port 264 of the second hybrid coupler 238 corresponds to an antenna port 268 of the duplexer system 230. Due to the −90° phase shift of the first phase-shifted transmit signal caused by the first hybrid coupler 232 and the −90° phase shift of the second phase-shifted transmit signal caused by the second hybrid coupler 238, the two phase-shifted transmit signals are in-phase at the third port 264 of the second hybrid coupler 238 and therefore constructively combine to provide a combined transmit signal.

During reception of an RF receive signal, the first phase-shifted transmit leakage at the third port 252 of the circulator 234 enters a first port 270 of the third hybrid coupler 240. Similarly, the second phase-shifted transmit leakage signal at the third port 258 of the circulator 236 enters a second port 272 of the third hybrid coupler 240. At this point, the first phase-shifted transmit leakage signal is approximately −90° out-of-phase with the second phase-shifted transmit leakage signal. The third hybrid coupler 240 applies an approximately −90° phase shift to the first phase-shifted transmit leakage signal when passing the first phase-shifted transmit leakage signal from the first port 270 to a third port 274 of the third hybrid coupler 240, and applies an approximately 0° phase shift to the second phase-shifted transmit leakage signal when passing the second phase-shifted transmit leakage signal from the second port 272 to the third port 274 of the third hybrid coupler 240. The third port 274 of the third hybrid coupler 240 corresponds to a receive port 276 of the duplexer system 230. Due to the phase shifts applied by the first and third hybrid couplers 232 and 240, the first and second phase-shifted transmit leakage signals are approximately 180° out-of-phase at the third port 274 of the third hybrid coupler 240. Therefore, the first and second phase-shifted transmit leakage signals destructively combine at the third port 274 of the third hybrid coupler 240. In this manner, the transmitter leakage is cancelled, or mitigated, before entering the receiver 222.

Due to, e.g., mismatch between the circulators 234 and 236 and/or non-ideal phase shifts of the first hybrid coupler 232 and/or the third hybrid coupler 240 and/or antenna reflections, there may be a residual transmitter leakage signal at the receive port 276 of the duplexer system 230. In this embodiment, the radio system 214 further includes a digital filter 278 and an auxiliary transmitter 280 that operate to generate a cancellation signal that is used to cancel the residual transmitter leakage signal. Note that, unlike the second transmitter 122 of the embodiments described above, the auxiliary transmitter 280 does not contribute to the transmit power of the radio system 214. The digital filter 278 is calibrated once (e.g., during manufacturing) or dynamically (e.g., during operation) to mitigate or minimize the residual transmitter leakage in the transmit frequency band and/or the receive frequency band using any suitable calibration technique. During operation, the digital input signal of the main transmitter 216 is also provided to the digital filter 278. Together, the digital filter 278 and the auxiliary transmitter 280 model the main transmitter 216 and the leakage path of the residual transmitter leakage through the duplexer system 230 but with a 180° phase shift. As a result, the digital filter 278 and the auxiliary transmitter 280 process the digital input signal to provide a cancellation signal that, ideally, is 180° out-of-phase with the residual transmit leakage signal but has the same magnitude and group delay as the residual transmit leakage signal. The cancellation signal is combined with the residual transmit leakage signal via a coupler 282 connected between the receive port 276 of the duplexer system 230 and the input of the receiver 222. In the coupler 282, the residual transmit leakage signal and the cancellation signal destructively combine to thereby further suppress or mitigate transmit leakage and improve transmit-receive isolation.

The systems and methods described herein, particularly those of FIGS. 5 through 11, provide a number of advantages. While not being limited to or by any particular advantage, some of the advantages are described below. Radio systems that simultaneously transmit and receive must have sufficient isolation between the transmitter and the receiver. In high power base stations of cellular communications networks, this isolation is typically achieved by using large and expensive cavity filters. However, because they are large and expensive, cavity filters are not desirable in small or low power base stations (e.g., Home enhanced Node Bs (Home eNBs) or other low power base stations utilized in heterogeneous deployments of a 3$^{rd}$ Generation Partnership Program (3GPP) Long Term Evolution (LTE) network). For the same reasons, cavity filters are also not desirable in wireless devices (e.g., mobile or user devices such as, e.g., User Equipment devices (UEs) in an LTE network). Using the systems and methods disclosed herein enables, in some implementations, the use of small duplex filters in a radio system. The benefit of small duplex filters is cost and size, both of which are important considerations for low power base stations and wireless (user) devices.

Further, active antenna cancellation systems are an important component of future base stations. Each antenna in an active antenna system requires its own duplexer. This means that, for example, an eight antenna active system (which is the largest mandated by the latest LTE standard) requires eight duplexers. When it is desirable or necessary to fit multiple duplexers into a base station (e.g., a small base station), then it is important that the duplexers employ small filter technology. The systems and methods can be used to provide improved isolation when using small filter technology for the duplexers.

In addition, as compared to the architecture of FIG. 11, the duplexer system 128 of FIGS. 5 and 7 uses one less hybrid coupler. The additional hybrid coupler in the architecture of FIG. 11 may degrade the receiver noise figure. Further, the architectures of FIGS. 5, 7, and 8 can isolate power amplifier distortion from the receiver 124 (as long as distortion between the PAs 134 and 140 is highly correlated). In the architecture of FIG. 11, for example, the auxiliary transmitter 280 may not be run at the same power level as the main transmitter 216 (since the power of the auxiliary transmitter 280 does not contribute to the output power of the radio system 214). As a result, the power amplifier distortion for the two transmitters 218 and 280 will not be equal. In other words, the auxiliary transmitter 280 can only cancel the linear transmit frequency band signal (i.e., the version of the signal that is available in the digital domain).

The following acronyms are used throughout this disclosure.

3GPP 3$^{rd}$ Generation Partnership Project
ADC Analog-to-Digital Converter
dB Decibel
DAC Digital-to-Analog Converter
eNB Enhanced Node B
FDD Frequency Division Duplexing
FIR Finite Impulse Response
GHz Gigahertz
IMD Intermodulation Distortion
LMS Least Mean Squared
LNA Low Noise Amplifier
LTE Long Term Evolution
MHz Megahertz
PA Power Amplifier
RF Radio Frequency
UE User Equipment Those skilled in the art will recognize improvements and modifications to the embodiments of the present disclosure. All such improvements and modifications are considered within the scope of the concepts disclosed herein and the claims that follow.

What is claimed is:

1. A system comprising:
a duplexer system having a first transmit port, a second transmit port, a receive port, and an antenna port, the duplexer system being configured to:
receive a first transmit signal at the first transmit port and a second transmit signal at the second transmit port, the first and second transmit signals being balanced transmit signals;
apply a first phase shift to the first transmit signal to provide a first phase-shifted transmit signal and apply a second phase shift to the second transmit signal to provide a second phase-shifted transmit signal;
combine the first phase-shifted transmit signal and the second phase-shifted transmit signal to provide a combined transmit signal at the antenna port;
receive an initial receive signal at the antenna port;
apply a third phase shift to the initial receive signal to provide a first receive signal and apply a fourth phase shift to the initial receive signal to provide a second receive signal;
apply a fifth phase shift to the first receive signal to provide a first phase-shifted receive signal and apply a sixth phase shift to the second receive signal to provide a second phase-shifted receive signal; and
combine the first phase-shifted receive signal and the second phase-shifted receive signal to provide a combined receive signal at the receive port; and
one or more digital filters configured to cause a phase difference between the first transmit signal received at the first transmit port and the second transmit signal received at the second transmit port such that:
a first transmit leakage signal resulting from leakage of the first transmit signal from the first transmit port to the receive port and a second transmit leakage signal resulting from leakage of the second transmit signal from the second transmit port to the receive port destructively combine at the receive port;
the phase difference between the first transmit signal and the second transmit signal and between the first and second phase shifts cause the first and second phase-shifted transmit signals to constructively combine to provide the combined transmit signal at the antenna port; and
the phase difference between the first transmit signal and the second transmit signal and between the fifth and sixth phase shifts cause the first transmit leakage signal resulting from leakage of the first transmit signal from the first transmit port to the receive port and the second transmit leakage signal resulting from leakage of the second transmit signal from the second transmit port to the receive port to destructively combine when combining the first and second phase-shifted receive signals to provide the combined received signal at the receive port.

2. The system of claim 1 wherein the duplexer system comprises:
a first duplexer device having a transmit port corresponding to the first transmit port of the duplexer system, a receive port, and an antenna port;
a second duplexer device having a transmit port corresponding to the second transmit port of the duplexer system, a receive port, and an antenna port;
a first combiner/splitter circuit having a first port coupled to the antenna port of the first duplexer device, a second port coupled to the antenna port of the second duplexer device, and a third port corresponding to the antenna port of the duplexer system; and
a second combiner circuit having a first port coupled to the receive port of the first duplexer device, a second port coupled to the receive port of the second duplexer device, and a third port corresponding to the receive port of the duplexer system.

3. The system of claim 2 wherein the first combiner/splitter circuit is a first hybrid coupler, and the second combiner circuit is a second hybrid coupler.

4. The system of claim 2 wherein the first duplexer device is a first duplex filter and the second duplexer device is a second duplex filter.

5. The system of claim 2 wherein the first duplexer device is a first circulator and the second duplexer device is a second circulator.

6. The system of claim 2 wherein:
the first combiner/splitter circuit is configured to:
receive the first transmit signal from the antenna port of the first duplexer device at the first port of the first combiner/splitter circuit and receive the second transmit signal from the antenna port of the second duplexer device at the second port of the first combiner/splitter circuit;
apply a first phase shift to the first transmit signal to provide the first phase-shifted transmit signal and apply a second phase shift to the second transmit signal to provide the second phase-shifted transmit signal;
combine the first phase-shifted transmit signal and the second phase-shifted transmit signal at the third port of the first combiner/splitter circuit to provide the combined transmit signal at the antenna port of the duplexer system;
receive an initial receive signal at the third port of the first combiner/splitter circuit; and
apply a third phase shift to the initial receive signal to provide the first receive signal at the first port of the first combiner/splitter circuit and apply a fourth phase shift to the initial receive signal to provide the second receive signal at the second port of the first combiner/splitter circuit; and
the second combiner circuit is configured to:
receive, at the first port of the second combiner circuit, the first receive signal from the receive port of the first duplexer device;
receive, at the second port of the second combiner circuit, the second receive signal from the receive port of the second duplexer device;
apply a fifth phase shift to the first receive signal to provide the first phase-shifted receive signal and apply a sixth phase shift to the second receive signal to provide the second phase-shifted receive signal; and
combine the first phase-shifted receive signal and the second phase-shifted receive signal to provide the combined receive signal at the third port of the second combiner circuit.

7. The system of claim 6 wherein:
the first phase shift is approximately 0 degrees;
the second phase shift is approximately −90 degrees;
the third phase shift is approximately 0 degrees;
the fourth phase shift is approximately −90 degrees;
the fifth phase shift is approximately −90 degrees; and
the sixth phase shift is approximately 0 degrees.

8. The system of claim 6 wherein the one or more digital filters are configured to cause the phase difference between the first transmit signal and the second transmit signal such that:
the phase difference between the first transmit signal and the second transmit signal and the first and second phase shifts cause the first and second phase-shifted transmit signals to constructively combine at the third port of the first combiner/splitter circuit to provide the combined transmit signal; and
the phase difference between the first transmit signal and the second transmit signal and the fifth and sixth phase shifts cause the first transmit leakage signal resulting from leakage of the first transmit signal from the first transmit port to the receive port and the second transmit leakage signal resulting from leakage of the second transmit signal from the second transmit port to the receive port to destructively combine at the third port of the second combiner circuit when combining the first and second phase-shifted receive signals to provide the combined received signal.

9. The system of claim 1 wherein the duplexer system comprises:
a first transmit filter having an input port corresponding to the first transmit port of the duplexer system and an output port;

a second transmit filter having an input port corresponding to the second transmit port of the duplexer system and an output port;
a combiner/splitter circuit having a first port coupled to the output port of the first transmit filter, a second port coupled to the output port of the second transmit filter, a third port corresponding to the antenna port of the duplexer system, and a fourth port; and
a receive filter having an input port coupled to the fourth port of the combiner/splitter circuit and an output port corresponding to the receive port of the duplexer system.

10. The system of claim 9 wherein the combiner/splitter circuit is a hybrid coupler.

11. The system of claim 9 wherein the combiner/splitter circuit is configured to:
for transmission:
receive the first transmit signal from the output port of the first transmit filter at the first port of the combiner/splitter circuit and receive the second transmit signal from the output port of the second transmit filter at the second port of the combiner/splitter circuit;
apply a first phase shift to the first transmit signal to provide a first phase-shifted transmit signal and apply a second phase shift to the second transmit signal to provide a second phase-shifted transmit signal; and
combine the first phase-shifted transmit signal and the second phase-shifted transmit signal at the third port of the combiner/splitter circuit to provide the combined transmit signal at the antenna port of the duplexer system; and
for reception:
receive an initial receive signal at the third port of the combiner/splitter circuit;
apply a third phase shift to the initial receive signal to provide a first receive signal at the first port of the combiner/splitter circuit and apply a fourth phase shift to the initial receive signal to provide a second receive signal at the second port of the combiner/splitter circuit;
receive the first receive signal at the first port of the combiner/splitter circuit after reflection of the first receive signal from the output port of the first transmit filter;
receive the second receive signal at the second port of the combiner/splitter circuit after reflection of the second receive signal from the output port of the second transmit filter;
apply a fifth phase shift to the first receive signal to provide a first phase-shifted receive signal and apply a sixth phase shift to the second receive signal to provide a second phase-shifted receive signal; and
combine the first phase-shifted receive signal and the second phase-shifted receive signal to provide a combined receive signal at the fourth port of the combiner/splitter circuit.

12. The system of claim 11 wherein:
the first phase shift is approximately −90 degrees;
the second phase shift is approximately 0 degrees;
the third phase shift is approximately −90 degrees;
the fourth phase shift is approximately 0 degrees;
the fifth phase shift is approximately 0 degrees; and
the sixth phase shift is approximately −90 degrees.

13. The system of claim 11 wherein the one or more digital filters are configured to cause the phase difference between the first transmit signal and the second transmit signal such that:
the phase difference between the first transmit signal and the second transmit signal and the first and second phase shifts cause the first and second phase-shifted transmit signals to constructively combine at the third port of the combiner/splitter circuit to provide the combined transmit signal; and
the phase difference between the first transmit signal and the second transmit signal and the fifth and sixth phase shifts cause the first transmit leakage signal resulting from leakage of the first transmit signal from the first transmit port to the fourth port of the combiner/splitter circuit and the second transmit leakage signal resulting from leakage of the second transmit signal from the second transmit port to the fourth port of the combiner/splitter circuit to destructively combine at the fourth port of the combiner/splitter circuit when combining the first and second phase-shifted receive signals to provide the combined received signal.

14. The system of claim 1 wherein the one or more digital filters comprise a digital filter configured to filter a digital input signal to provide a filtered digital input signal, and the system further comprises:
a first transmitter configured to process the digital input signal to provide the first transmit signal; and
a second transmitter configured to process the filtered digital input signal to provide the second transmit signal.

15. The system of claim 14 wherein the first and second transmitters are balanced, and power of both of the first and second transmitters contributes to power of the combined transmit signal.

16. The system of claim 1 wherein the one or more digital filters further operate to compensate for analog imperfections in the duplexer system.

17. The system of claim 1 wherein the one or more digital filters are configured to adjust a phase and at least one of a magnitude and a group delay of at least one of the first and second transmit signals such that residual transmitter leakage after destructively combining the first and second transmit leakage signals is minimized.

18. The system of claim 1 wherein the one or more digital filters are configured to adjust a phase and at least one of a magnitude and a group delay of at least one of the first and second transmit signals such that residual transmitter leakage in a transmit band after destructively combining the first and second transmit leakage signals is minimized.

19. The system of claim 1 wherein the one or more digital filters are configured to adjust a phase and at least one of a magnitude and a group delay of at least one of the first and second transmit signals such that residual transmitter leakage in a receive band after destructively combining the first and second transmit leakage signals is minimized.

20. The system of claim 19 wherein the residual transmitter leakage in the receive band comprises at least one of intermodulation distortion and noise.

21. The system of claim 1 wherein the one or more digital filters are configured to adjust a phase and at least one of a magnitude and a group delay of at least one of the first and second transmit signals such that transmitter leakage in both the transmit band and the receive band are mitigated.

22. A method comprising:
combining, via a duplexer system, a first transmit signal and a second transmit signal to provide a combined transmit signal at an antenna port of the duplexer system, the first and second transmit signals being balanced transmit signals;

applying a first phase shift to the first transmit signal to provide a first phase-shifted transmit signal and applying a second phase shift to the second transmit signal to provide a second phase-shifted transmit signal;

combining the first phase-shifted transmit signal and the second phase-shifted transmit signal to provide the combined transmit signal at the antenna port;

receiving an initial receive signal at the antenna port;

applying a third phase shift to the initial receive signal to provide a first receive signal and applying a fourth phase shift to the initial receive signal to provide a second receive signal;

applying a fifth phase shift to the first receive signal to provide a first phase-shifted receive signal and applying a sixth phase shift to the second receive signal to provide a second phase-shifted receive signal;

combining the first phase-shifted receive signal and the second phase-shifted receive signal to provide a combined receive signal at a receive port; and causing, via one or more digital filters, a phase difference between the first transmit signal and the second transmit signal such that:

a first transmit leakage signal resulting from leakage of the first transmit signal from a first transmit port of the duplexer system to the receive port of the duplexer system and a second transmit leakage signal resulting from leakage of the second transmit signal from a second transmit port of the duplexer system to the receive port of the duplexer system destructively combine at the receive port;

the phase difference between the first transmit signal and the second transmit signal and between the first and second phase shifts cause the first and second phase-shifted transmit signals to constructively combine to provide the combined transmit signal at the antenna port; and the phase difference between the first transmit signal and the second transmit signal and between the fifth and sixth phase shifts cause the first transmit leakage signal resulting from leakage of the first transmit signal from the first transmit port to the receive port and the second transmit leakage signal resulting from leakage of the second transmit signal from the second transmit port to the receive port to destructively combine when combining the first and second phase-shifted receive signals to provide the combined received signal at the receive port.

* * * * *